United States Patent [19]
Jirnov et al.

[11] Patent Number: 5,839,270
[45] Date of Patent: Nov. 24, 1998

[54] SLIDING-BLADE ROTARY AIR-HEAT ENGINE WITH ISOTHERMAL COMPRESSION OF AIR

[76] Inventors: Olga Jirnov; Alexei Jirnov, both of 9105 Braeburn Valley Dr., #14, Houston, Tex. 77074

[21] Appl. No.: 770,990

[22] Filed: Dec. 20, 1996

[51] Int. Cl.$^6$ .................................. F02G 3/00; F02C 6/00
[52] U.S. Cl. .................. 60/39.05; 60/39.182; 60/39.511; 60/39.55
[58] Field of Search .............................. 60/39.05, 39.12, 60/39.182, 39.511, 39.55, 39.52, 730

[56] References Cited

U.S. PATENT DOCUMENTS

| | | | |
|---|---|---|---|
| 3,365,565 | 1/1968 | Aguet | 60/39.182 |
| 3,796,045 | 3/1974 | Foster-Pegg | 60/39.182 |
| 5,181,376 | 1/1993 | Rao | 60/39.182 |

*Primary Examiner*—Noah P. Kamen
*Attorney, Agent, or Firm*—Kenneth A. Roddy

[57] ABSTRACT

A sliding-blade rotary air-heat engine utilizes isothermal compression of air and regeneration of waste heat to achieve high thermal efficiency and reduce environmentally damaging emissions. Ambient air is mixed with fine dispersed water and the air-water mixture is isothermally compressed in a sliding-blade air-water compressor. The compressed air is separated from the water and supplied to a vortex heat exchanger/recuperator where it is preheated using waste heat and arrives at a vortex combustion chamber. Heated air from the combustion chamber enters a sliding-blade gas expander, is adiabatically expanded performing useful work and causing simultaneous rotation of the air-water compressor rotor. Spent working fluid from the gas expander is supplied to the vortex heat exchanger/recuperator isobarically giving up its waste heat to air and is discharged through an exhaust port. Separated water enters the gas expander cooling system and is discharged into a radiator/condenser, cooled and injected into the air-water compressor operating chamber to complete the cycle. In another embodiment, water from the gas expander cooling system enters a vortex boiler, is evaporated to be used as waste heat and during the vapor cycle performs useful work in rotating a sliding-blade steam expander rotor connected with the gas expander and air-water compressor rotors. The spent steam is conducted to the radiator/condenser where it is condensed and cooled.

20 Claims, 19 Drawing Sheets

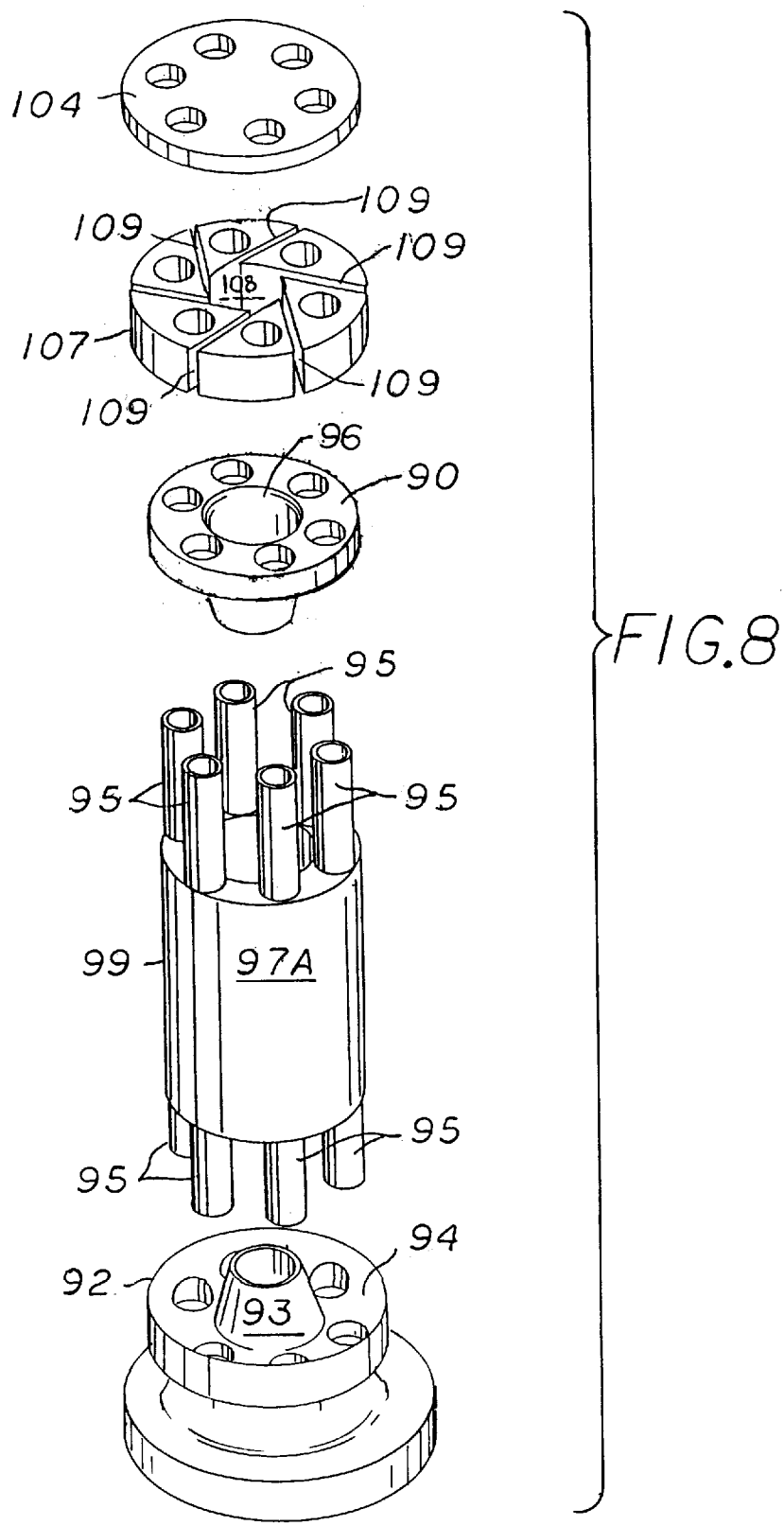

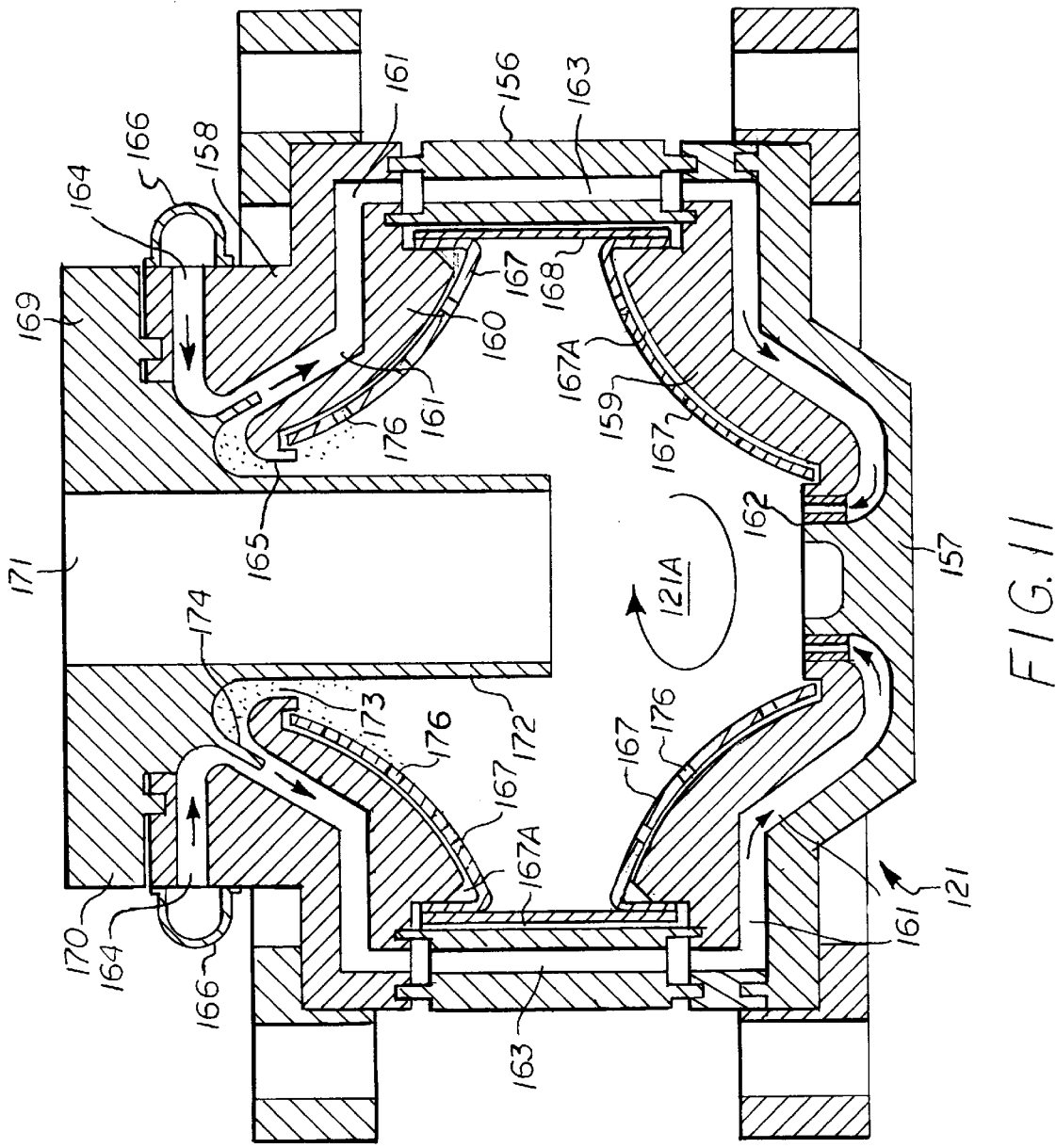

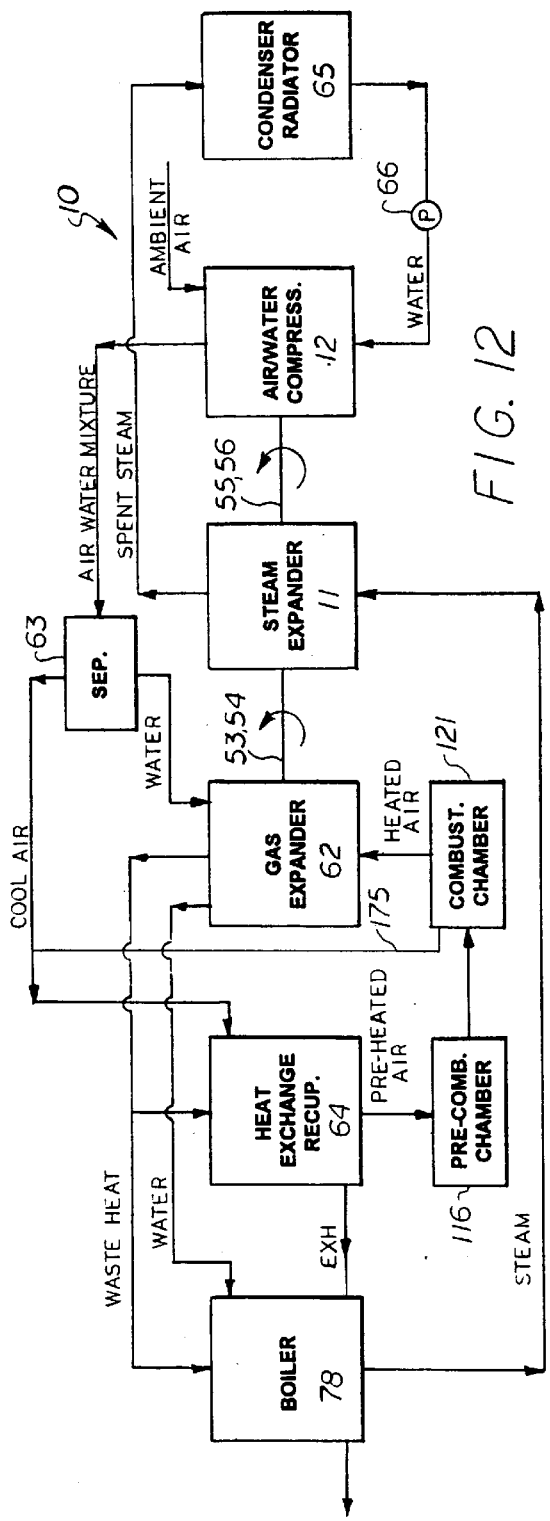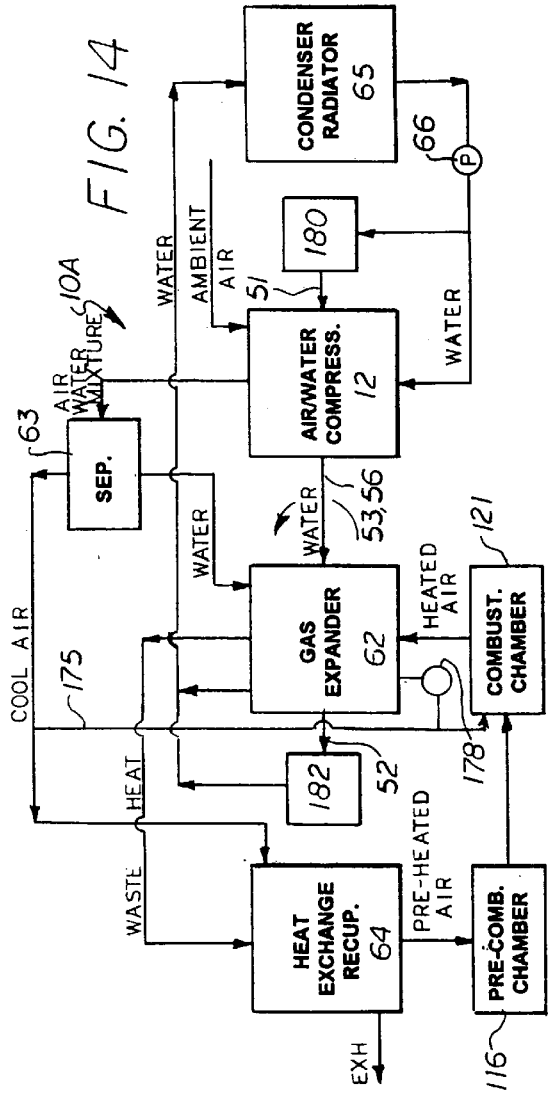

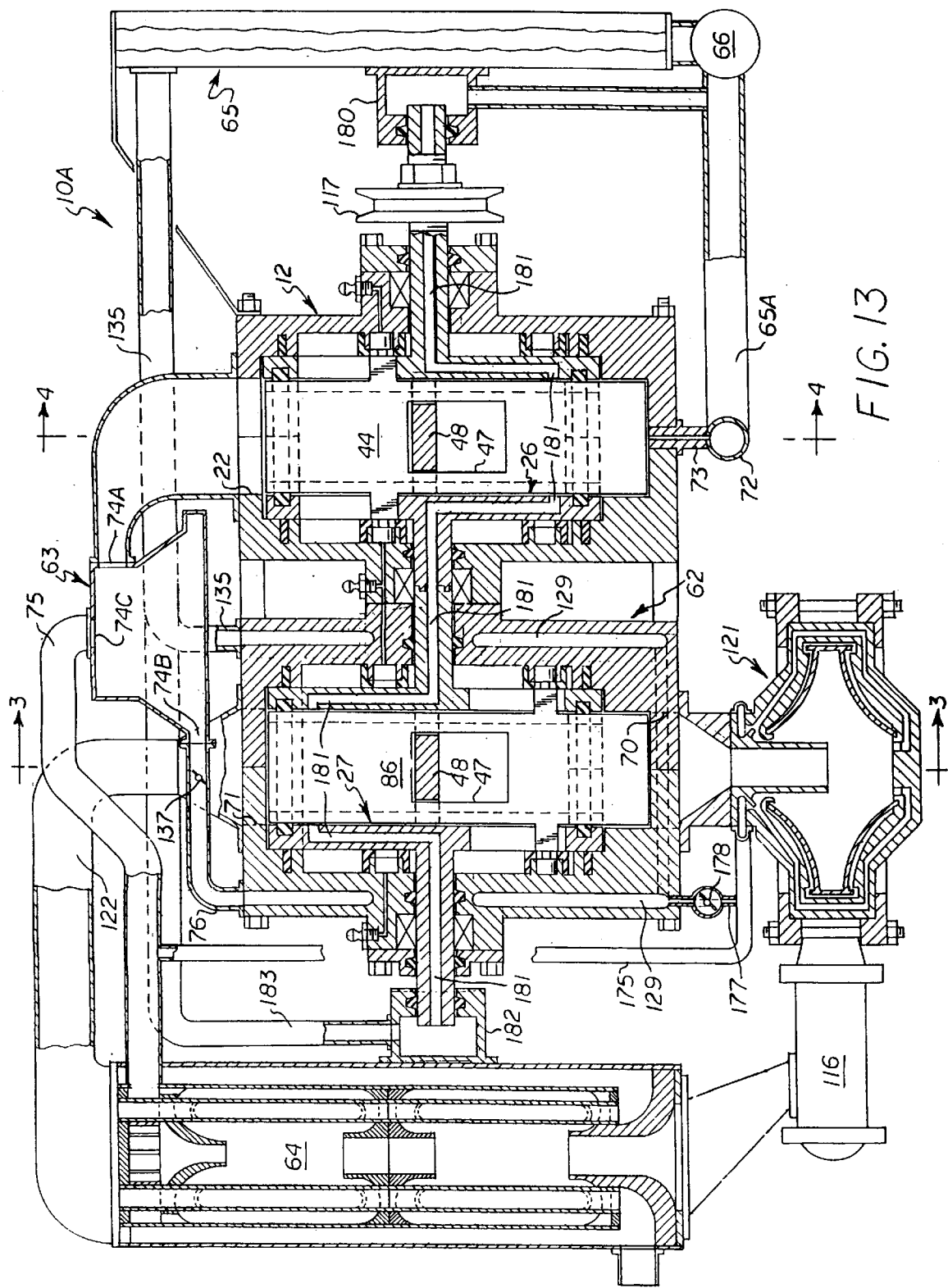

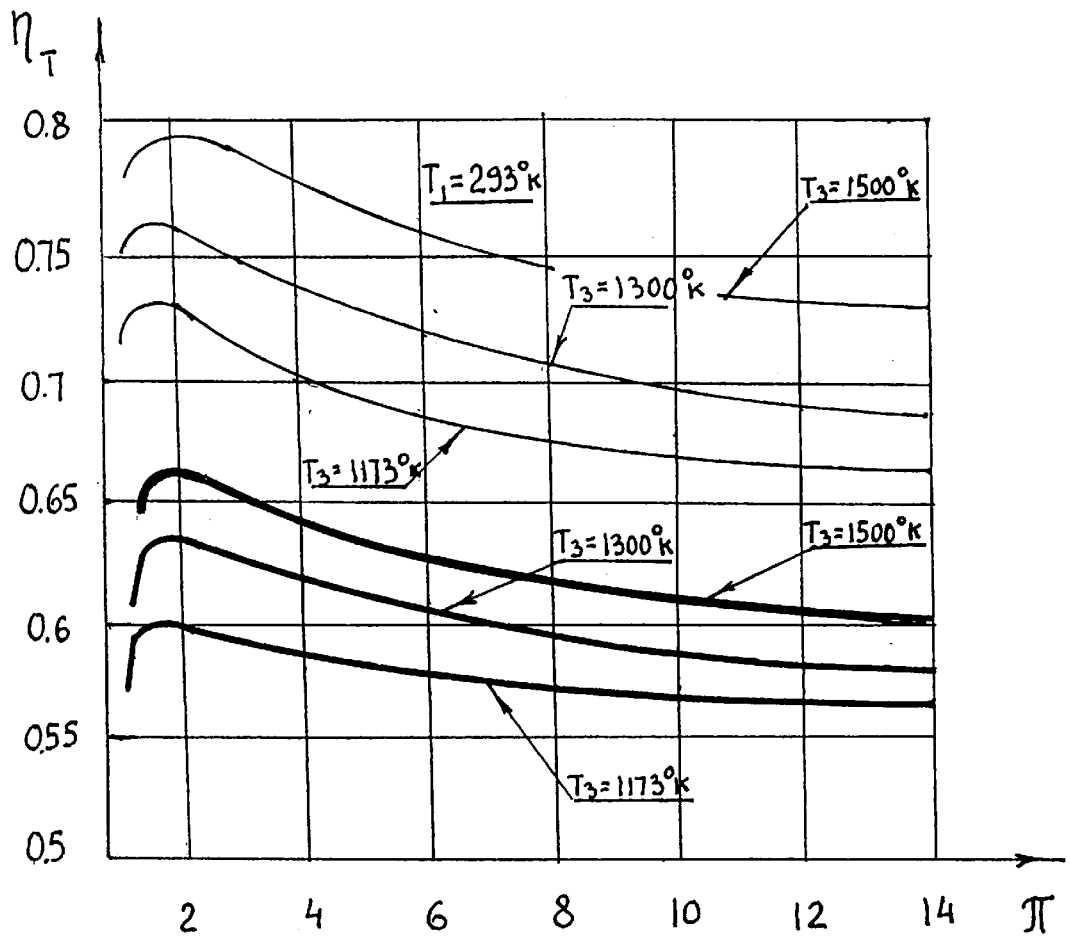

$$\eta_{T_T} = \frac{\frac{K}{K-1} T_3 \left[1 - \left(\frac{1}{\pi}\right)^{\frac{K-1}{K}}\right] - T_1 \ln \pi}{\frac{K}{K-1} T_3 \left[1 - \left(\frac{1}{\pi}\right)^{\frac{K-1}{K}}\right]}$$

$$\eta_{T_A} = \frac{\eta_\varepsilon \frac{K}{K-1} T_3 \left[1 - \left(\frac{1}{\pi}\right)^{\frac{K-1}{K}}\right] - \left(\frac{1}{\eta_c} + \eta_I\right) T_1 \ln \pi}{\eta_\varepsilon \frac{K}{K-1} T_3 \left[1 - \left(\frac{1}{\pi}\right)^{\frac{K-1}{K}}\right] + (1-\eta_R) \frac{K}{K-1} \left\{\left\{T_3 \left\{1 - \eta_\varepsilon \left[1 - \left(\frac{1}{\pi}\right)^{\frac{K-1}{K}}\right]\right\} - T_2\right\}\right\}}$$

FIG.16

SLIDING-BLADE ROTARY AIR-HEAT ENGINE WITH ISOTHERMAL COMPRESSION OF AIR

BACKGROUND OF THE INVENTION

1. Field Of The Invention

This invention relates generally to heat engines, and more particularly to a sliding-blade rotary air-heat engine with isothermal compression of air which has high thermal efficiency and low maximum cycle pressure.

2. Brief Description Of The Prior Art

Heat engines are known in the art which have combined cycles such as a combination of Brayton and Rankine cycles.

Fruschi, U.S. Pat. No. 5,386,685 discloses a method and apparatus for a combined cycle power plant; Simpkin, U.S. Pat. No. 5,431,016 discloses a high efficiency power generation engine; Tomlinson et al, U.S. Pat. No. 5,428,950 discloses a steam cooled gas turbine with a combined steam cycle.

One of the principal shortcomings of these combined cycle power plants is that they do not accomplished the optimal effect from regeneration of heat which is possible if gas in a compressor is being compressed isothermally. Practically, it is not efficient nor effective to isothermally compress air through the use of a high-speed turbine compressor using an indirect heat exchanger, for example the water cooling unit as in U.S. Pat. No. 5,386,685. This can be accomplished when compressing a mixture of air and a substance able to completely absorb adiabatic heat in the compression process, such as for example, dispersed water or ammonia. Because of this, conventional high speed gas turbine compressors are not able to operate on a combined cycle two-phase gas-liquid medium since a liquid of the mixture produces destructive erosion of blades (for example in General Electric's "H turbine" technology). An article by Michael Valenti in the magazine *Mechanical Engineering*, July 1995, pages 86–89, titled "Breaking the Thermal Efficiency Barriers", outlines the principle limitation on thermal efficiency.

In the present invention, the engine employs a sliding-blade air-water compressor with the average circumferential speed of rotor rotation less than conventional turbine or vane compressors and is free of streams flowing past the vanes. In the present invention the liquid phase i:, not a destructive factor, but by contrast, improves the compression process by providing the means for hydraulic packing of clearances.

Another problem with the conventional combined cycle power plants is that they are complex constructions which increase manufacturing and operating cost and lowers the economic efficiency.

Stirling and Ericsson cycles also are known in the art. In spite of the inherently high thermal efficiency of these cycles, the actual thermal efficiencies of air-heat engines were poor. The main reason for these low efficiencies was the fact that heat must be transferred in all four processes through gas films on the heat-transfer surfaces. Since gas films offer relatively high resistance to heat transfer, the mean cycle temperatures were very much lower than the theoretical temperature. The resulting low thermal efficiency together with high maintenance problems and high engine bulk led to the disuse of these engines.

In contrast to these cycles, the present invention provides a thermodynamic cycle wherein the: inferior isothermal expansion (that is pseudo-isothermal expansion) is replaced with adiabatic expansion followed by a deep regeneration of heat, and full value isothermal compression is accomplished by compressing the mixture of a two-phase working medium mixture of gas and fine-dispersed liquid (heat capacitance phase) which effectively absorbs adiabatic heat in the compression process followed by utilization of this heat to execute useful work in the Rankine cycle. This regenerative cycle allows the engine to obtain maximum high actual thermodynamic efficiency in an air-heat engine operating in an open-cycle, and it is carried out in a sliding-blade air-heat internal combustion engine of simple construction.

Integrated conventional gas turbine power plants which include a hydraulic air compressor for providing isothermal pressurized air for the turbine are also known in the art.

Angle, U.S. Pat. No. 5,099,648 discloses a hydraulic air compressor and turbine apparatus. Jensen, U.S. Pat. No. 4,947,647 discloses an energy storage and generation hydro well apparatus. Richardson, U.S. Pat. No. 4,797,563 discloses a power plant. Giles et al, U.S. Pat. No. 4,569,194 discloses a integrated coal-fired gas turbine power plant. Hydraulic air compressors used with a turbine are discussed in an article titled "Combustion Turbine" in *ASME COGEN TURBO POWER*, 1995, pages 291–297.

One of the principal shortcomings of these systems and power plants is that the process requires a reservoir which is cumbersome and excludes the possibility of developing a compact engine for a power plant and particularly an engine for transportation. These systems of isothermal air compression also require large amounts of water for extracting adiabatic heat which impedes the use of this heat for useful work and lowers thermal efficiency.

Piston engines are also well known in the prior art. However, conventional reciprocating piston engines have relatively complicated designs and have large energy losses associated with the conversion of the energy from the combustion of the fuel into the kinetic energy associated with work or movement. The total mechanical losses in a piston engine can be presented as the sum of piston/ring assembly friction losses, camshaft and valving friction losses, compression and throttling work losses, and crankshaft and auxiliary devices losses. Due to the length of time required to complete combustion, the ignition point is usually advanced from top dead center causing an additional retarding force to develop which acts against the upward movement of the piston, thus, reducing fuel efficiency and maximum power output.

The combustion process in these dynamic conditions impede completeness of fuel combustion that results in elevated emission of toxic components in the exhaust gases. Moreover, reciprocating piston engines require high quality fuel and the necessity of filling the cylinder volume with a dense charge of air, making exhaust heat regeneration non-suitable. Conditions essential for reliable ignition and sustained combustion of fuel in the combustion chamber of conventional piston engines limit the value of the coefficient of air redundancy ($\alpha$), which leads to high temperature of combustion products in the reaction zone and causes elevated emission of NOx.

In comparison, the present sliding-blade engine has a vortex combustion chamber with a pre-combustion chamber which successfully solves problems associated with operating on multi-fuels with a high completeness of combustion over the wide range of the coefficient of air redundance ($\alpha$) and produces a substantial drop in toxity of exhaust gases.

Gas turbine low-power engines are also not suitable for use as a main engine for automobile vehicles because the torque is produced by force developed by gas flowing about turbine wheel blades which gives them low acceleration characteristics. Moreover, gas turbine engines have very high speed (RPM), and rather low effective efficiency, particularly the single stage turbine engine. The latter are impacted by the smaller blade heights where Reynolds number effects and surface roughness influence the blading efficiencies.

Torque in the present engine, unlike the conventional turbine engine, is produced by force induced by the normal pressure of expanding gas on the surface of "sliding blades" without gas flowing that governs its high engine pick up, and this force is transmitted directly to a power take-off shaft without using a crankshaft, unlike conventional piston engines. The low-speed, kinematic, and characteristic properties of the working process of the present engine make it practically noiseless.

The present engine has the following advantages over a piston type engine:
1. High thermal and volumetric efficiency.
2. Friction free sliding.
3. Ability to work while overloaded.
4. May employ a variety of types of combustible hydrocarbon gas or liquid fuels.
5. Has reduced quantities of environmentally damaging emissions.
6. Simplified engine design and ease of fabricating.

The present engine also has the following significant advantages over gas turbine low-power engines at equal starting parameters:
1. Low RPM, directly rotational power output, allowing simplified engine design.
2. High thermal efficiency.
3. Ease of fabricating.
4. Substantially increased engine pick-up.
5. Ability to operate on mixture of work medium with large quantity of liquid phase.

There are also known vane pump designs for performing a variety of functions in which vane radial travel is accomplished by the interaction between vane tips with the internal body bore.

Sliding-vane pumps are known in the art which are designed for performing a plurality of functions in which vane radial travel is accomplished by the interaction between vane tips with the internal body bore. Ruzic, U.S. Pat. No. 5,144,802 discloses such a rotary fluid apparatus having pairs of connected vanes.

The principle disadvantage of such apparatus is that their design does not allow inlet and outlet channels at the full width of operating chambers which lowers its filling coefficient and leads to elevated hydrodynamic losses and also causes intensive wear of the vane tips. Moreover, lubricant is present in the operating chamber which excludes it's application as an air-water compressor.

Hiroshi et al, U.S. Pat. No. 5,044,910 discloses a vane pump with rotatable drive means for vanes wherein the vane tips are prevented from contacting the internal body bore. However, in this type of pump, the vane movement control means are positioned in the operating chambers and are not protected from interaction with the working medium. Moreover, the short vanes extend maximally in rotor slots and are subjected to large bending loads that subject the slot area to distortion and results in increased resistance as they slide in the slots.

Vane-type rotary pumps are also known in the art wherein the vanes are prevented from contacting the internal bore of the body. Chu, U.S. Pat. No. 5,385,458 discloses a vane-type rotary compressor. Eckharolt, U.S. Pat. No. 5,316,456 discloses a slide vane machine. Clerc, U.S. Pat. No. 2,562,698 discloses a rotary compressor having short vanes resting on rollers. Because of the large bending moment, such short vanes do not give full value positive effect.

One of the main disadvantages of the aforementioned apparatus is their intolerance of small amounts of liquids, because the critical surfaces of the structures requiring lubrication are not isolated from the working medium. For example, vane tips sliding over the fixed wall, vane movement control means and the like.

The perfection of the regenerative cycle and the engine to a large extent depends on the effectiveness of the thermal exchange in the heat exchanger/recuperator. The design of the heat exchanger of the present air-heat engine, its thermal effectiveness, overall dimensions, and weight is appreciably better than known designs. This is achieved by employing vortical streams with multiple recirculation of the working medium in a process of heat exchange. In the process, separation of two-phase working medium (cool and hot fluid) occurs by centrifugal force, which maintains contact of only the cool phase with the heat transferring wall of the heat exchanger that results in increased rate of heat transfer.

In an article written by Z. Guo arid V. K. Dhir titled "Effects of Injection Induced Swirl Flow on Single and Two-Phase Heat Transfer" (ASME HTDF Vol. 81, pp 77–84, 1987), Guo and Dhir tested tangential injection of fluid into a boiler. They investigated single and two-phase heat transfer in tangential injection induced swirl flow. They observed that local heat transfer (Nusselt number, Nu) was increased up to 700% when all of the fluid was injected tangentially. They investigated heat transfer in a linear tube where swirl flow was generated by a vortex chamber positioned at its inlet. This design is not optimal, because the swirl flow attenuates and is not maintained the entire length of the heat transfer surface.

Yet, to the present day, there is no known heat exchanger design which effectively utilizes this effective heat exchange method. The heat exchanger of the present sliding-blade engine fulfills this need and overcomes the above described problems by providing a vortex clamber positioned at the tube inlet and ejectors with feedback loops positioned along the length of the heat transfer section. This enables the results to be increased by inducing swirl flow and intensive recirculation of fluid all along the length of the heat transfer section.

SUMMARY OF THE INVENTION

It is therefore an object of the present invention to provide an air-heat engine and isothermal compression method which has improved fuel efficiency.

It is another object of this invention to provide an air-heat engine and isothermal compression method which will reduce environmentally damaging emissions.

Another object of this invention is to provide an air-heat engine and isothermal compression method which may employ a variety of types of combustible hydrocarbon gas or liquid fuels.

Another object of this invention is to provide an air-heat engine and isothermal compression method which may be used for converting thermal energy into electric power.

A further object of this invention is to provide an air-heat engine which may be utilized as a transportation engine with high thermal efficiency.

A still further object of this invention is to provide an air-heat engine which is economical to manufacture in mass production and is inexpensive to operate, service and repair.

Other objects of the invention will become apparent from time to time throughout the specification and claims as hereinafter related.

The above noted objects and other objects of the invention are accomplished by an air-heat engine having a sliding-blade air-water compressor and sliding-blade gas and steam expanders, a separator, a heat exchanger/recuperator, a vortex boiler, a radiator/condenser, a pre-combustion chamber, and a vortex combustion chamber. The air-water compressor and gas and steam expanders have oval-shaped operating chambers with cylindrical rotors rotatably mounted eccentrically therein. Each rotor has at least two rectangular blades slidably mounted in slots extending through the cylindrical rotor in mutually perpendicular relation and each blade is independently movable relative to the other in a radial direction. Each blade has a guide element extending from opposed sides and through the opposed end walls of the respective rotor which are slidably received in guide grooves in the respective chamber end walls. The rotors are connected together by shafts in concentric relation whereby rotation of the expander gas and steam rotors causes simultaneous rotation of the air-water compressor rotor and the guide elements traveling in the cylindrical-shaped guide grooves cause the blades to extend and retract radially with their outer ends following the inner periphery of the respective chamber side wall with a constant minimum clearance. The sliding-blade movement control members are lubricated and isolated from the working medium.

In operation, rotation of the air-water compressor rotor draws ambient air into the air-water compressor operating chamber, isothermally compresses it where the fine dispersed water is simultaneously injected at a temperature and quantity sufficient for adiabatic heat absorption and isothermal compression of the air. This air-water mixture is compressed and discharged into the vortex separator where the water is separated, passes to the vortex boiler, vaporized using waste heat of spent working fluid and enters the steam expander operating chamber to turn the air-water compressor rotor. The spent steam-water mixture is discharged from the steam expander, enters the radiator/condenser where the water is condensed and cooled down and injected into the air-water compressor operating chamber and mixed again with the air. Compressed air without water enters the heat exchanger/recuperator, is preheated using spend heat of working fluid discharged from the gas expander operating chamber, and is conducted to the vortex combustion chamber.

The working fluid (the compressed and heated air) from the combustion chamber entering the gas expander operating chamber causes rotation of the gas expander and air-water compressor rotors and performs useful work. Spent working fluid leaving the gas expander operating chamber is divided into a first stream which enters the heat exchanger/recuperator to provide residual heat to compressed air, and a second stream which enters the vortex boiler where it evaporates water and superheats steam. After giving up heat, both cooled streams are exhausted. Engine construction is substantially simplified by utilizing water heated by adiabatic heat in the process of isothermal compression of air rather than as a working stream.

BRIEF DESCRIPTION OF THE DRAWINGS

FIG. 8 is an isometric view of a portion of the vortex heat exchanger/recuperator and boiler heat transfer section of the air-heat engine shown an unassembled condition.

FIG. 11 is a vertical cross section through the vortex combustion chamber of the air-heat engine.

FIG. 12 is a block diagram showing the various fluid flow paths of the engine of FIG. 1.

FIG. 13 is a vertical cross section of a modified air-heat engine without the vortex boiler and steam expander.

FIG. 14 is a block diagram showing the various fluid flow paths of the modified air-heat engine of FIG. 13.

FIG. 16 is a graph showing of the dependence of the theoretical and actual thermal efficiency on the pressure ratio of the working fluid of the engine of FIG. 13.

DESCRIPTION OF THE PREFERRED EMBODIMENT

Figure 1:
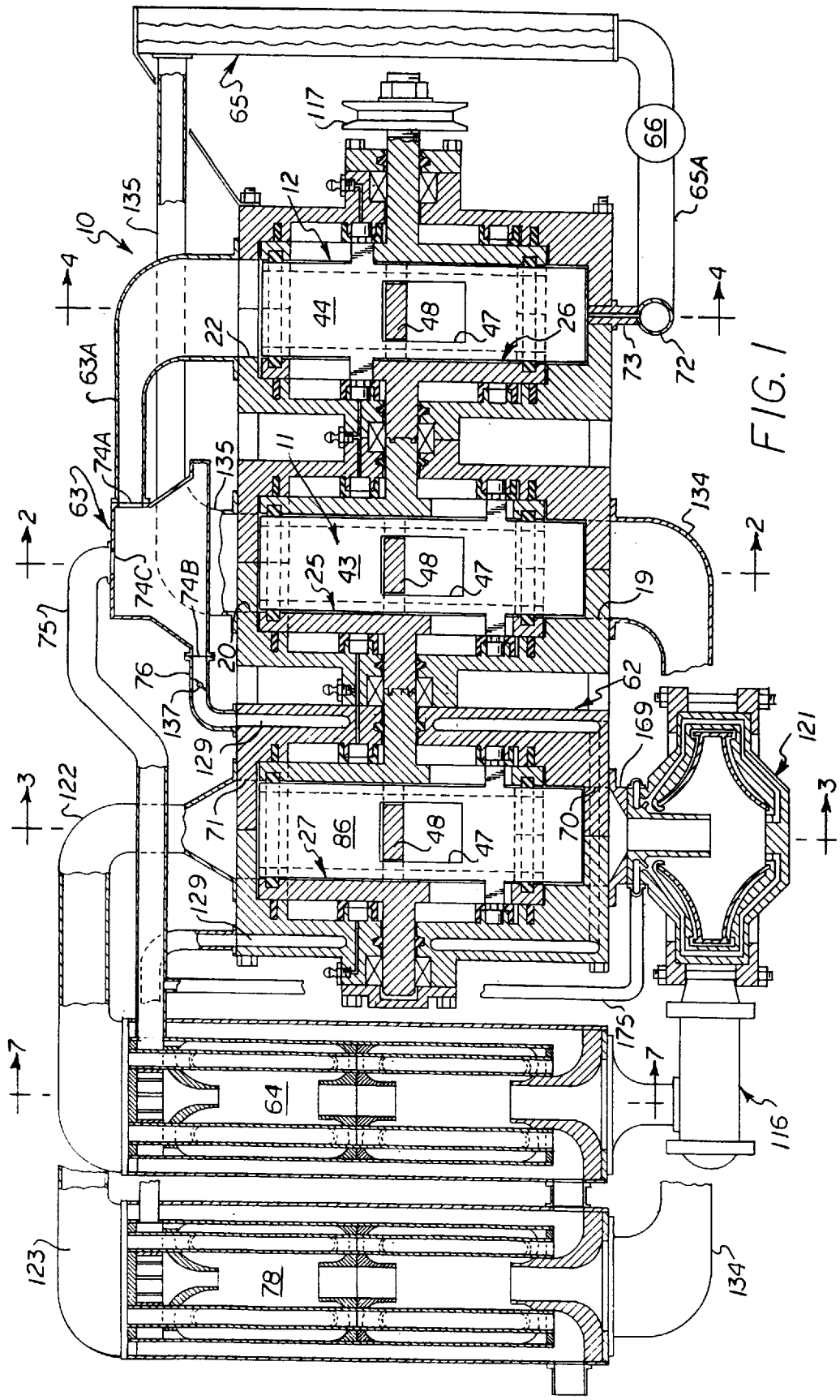
FIG. 1 is vertical cross section of a first embodiment of the air-heat engine with isothermal compression of air in accordance with the present invention.
Figure 1A:
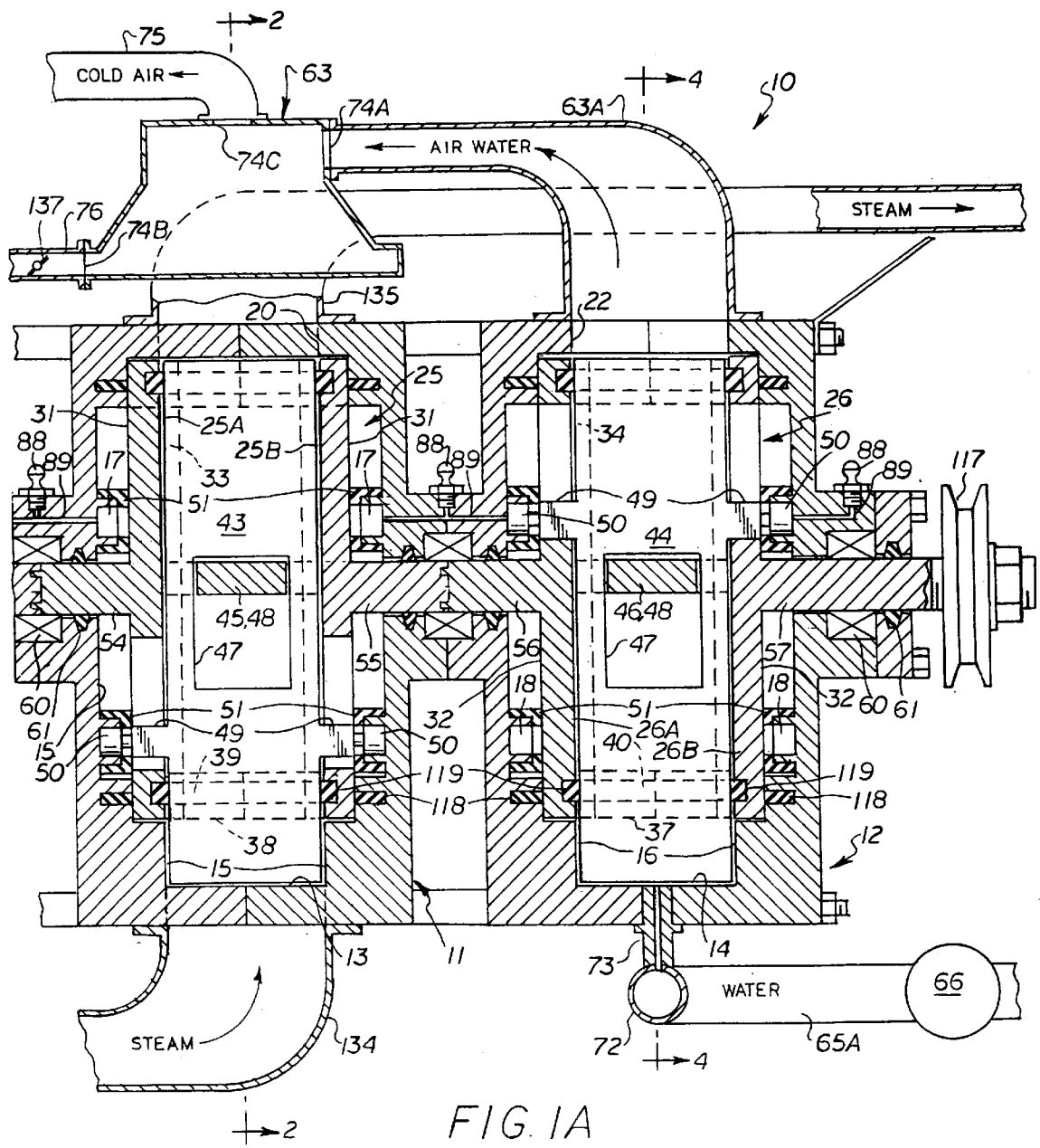
FIGS. 1A, 1B, and 1C taken together are vertical cross sections of the air-heat engine, shown in larger scale.
Figure 1B:
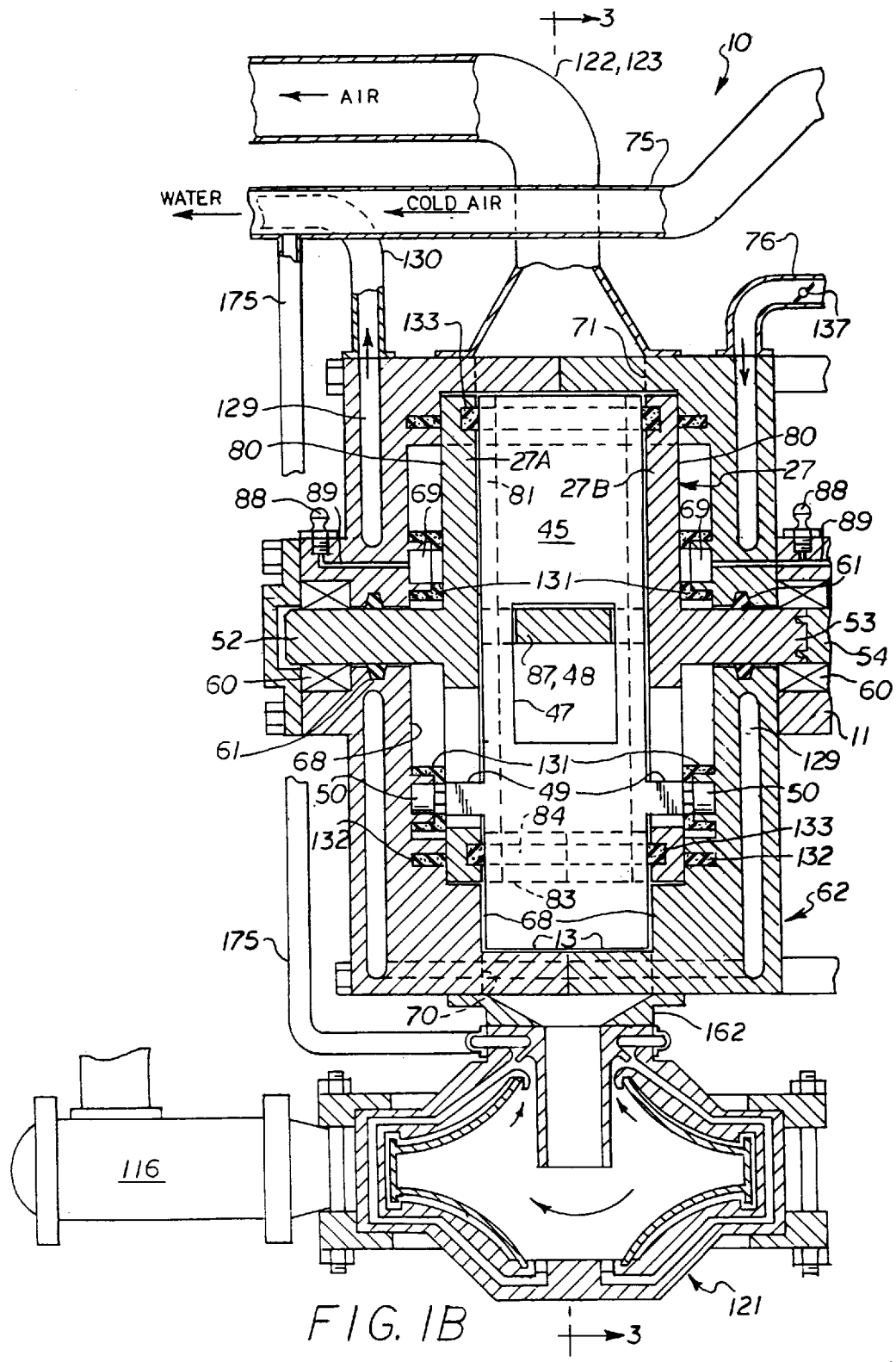
Figure 1C:
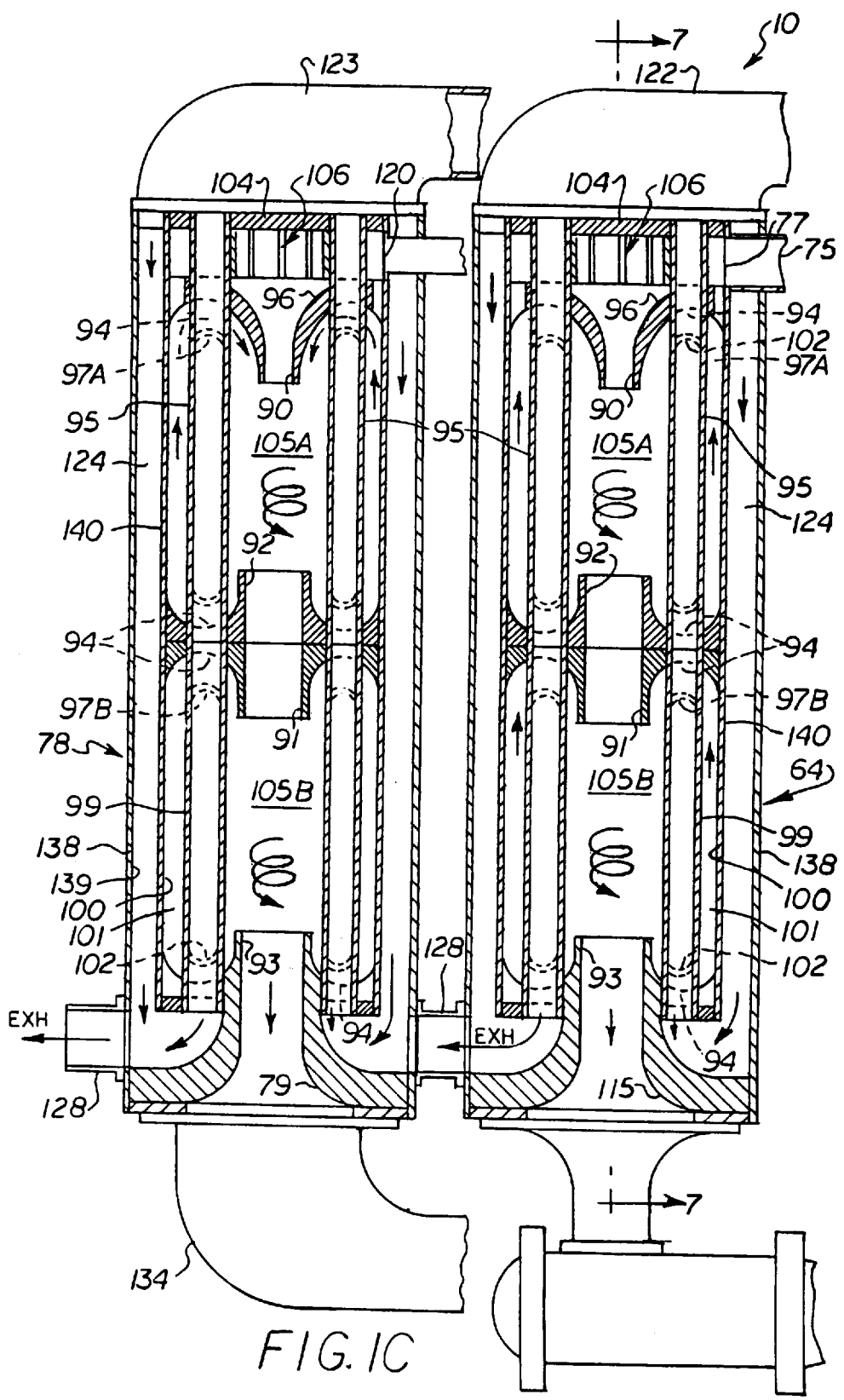

FIG. 1 shows a complete assembly of a first embodiment of a preferred sliding-blade rotary air-heat engine which utilizes isothermal compression of air in accordance with the present invention. FIGS. 1A, 1B, and 1C show the components of the engine in larger scale. Referring to FIGS. 1, 1A, 1B, and 1C of the drawings by numerals of reference, the air-heat engine 10 has an oval shaped sliding-blade steam expander operation chamber 11, an adjacent sliding-blade air-water compressor operating chamber 12, a sliding-blade gas expander operating chamber 62, a vortex separator 63, a vortex heat exchanger/recuperator 64, a vortex boiler 78, a pre-combustion chamber 116, a vortex combustion chamber 121, a radiator/condenser 65, and a pump 66. The steam expander operating chamber 11, air-water operating chamber 12, and the gas expander operating chamber 62 are similar in construction.

Figure 2:
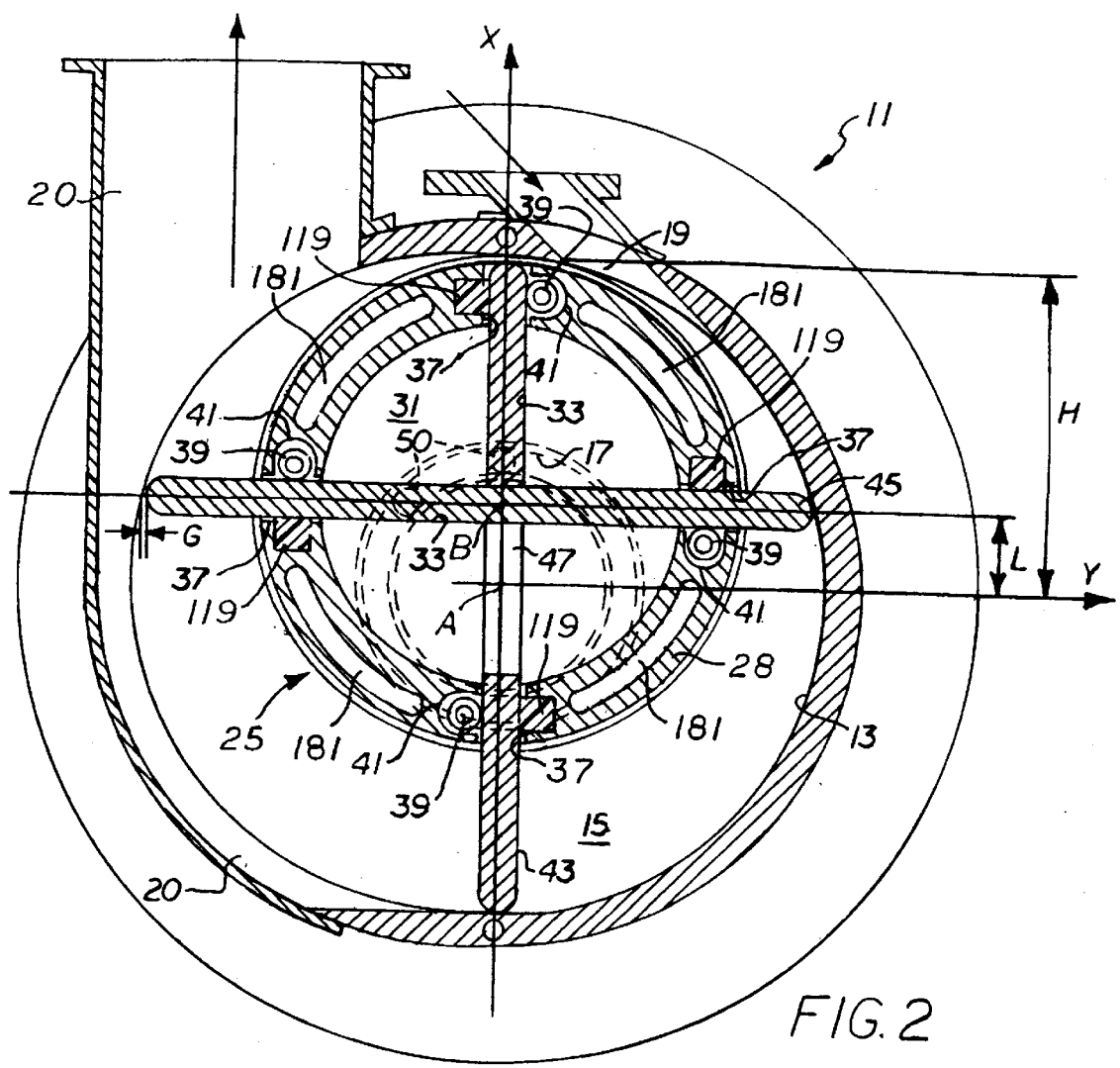
FIG. 2 is a vertical cross section through the steam expander chamber of the air-heat engine taken along line 2—2 of FIGS. 1, 1A, 13 and 13A.

Referring to FIGS. 1A and 2, the steam expander operating chamber 11 is defined by an oval shaped cavity having contoured oval-shaped side walls 13 and opposed facing flat end walls 15. Continuous cylindrical-shaped guide grooves 17 are formed in the opposed interior surfaces of the flat end walls 15. The interior and exterior peripheral surfaces of the guide grooves 17 are raised above the flat end walls 15. As best seen in FIG. 2, the center "A" of the cylindrical-shaped guide grooves is concentric with the center of the oval-shaped chamber. The steam expander chamber 11 has an inlet port 19 through its side wall 13 positioned at an angle to allow entry the working fluid into the chamber tangential to the plane of rotation and a relatively large outlet port 20 which extends circumferentially along approximately one-half of the side wall and allows the working medium to exit tangential to the plane of rotation. The width of the inlet port 19 and outlet port 20 are approximately the same width as the interior of the steam expander chamber 11 to provide maximum filling of the volume of the chamber and minimize hydrodynamic loss. In FIGS. 1 and 1A, the inlet and outlet ports 19 and 20 are shown out of position for ease of understanding. The inlet port 19 is connected with the outlet of the vortex boiler 78 by a conduit 134, and the outlet port 20 of the steam expander chamber 11 is connected to the radiator/condenser 65 by a conduit 135.

Figure 3:
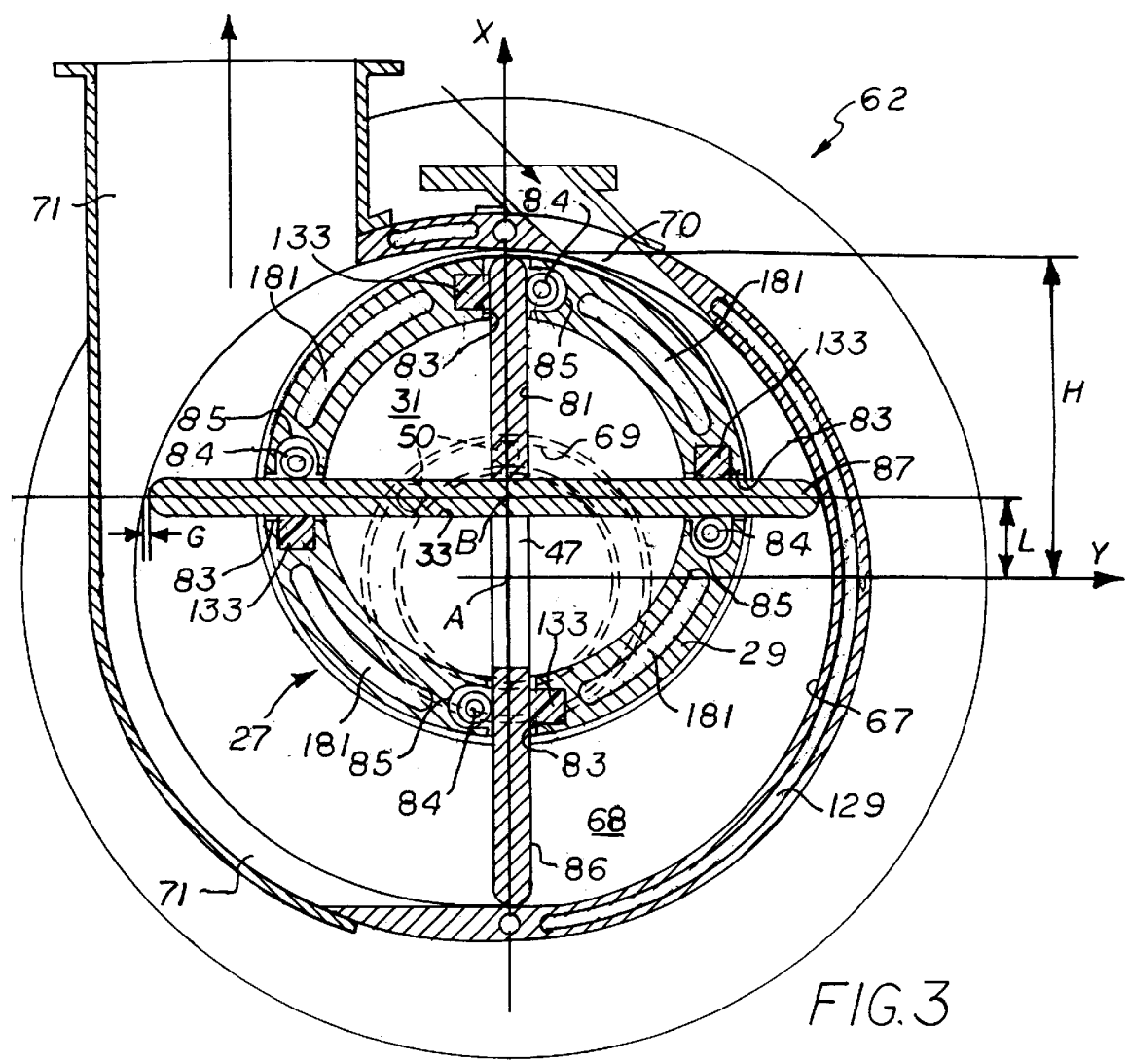
FIG. 3 is a vertical cross section through the gas expander chamber of the air-heat engine taken along line 3—3 of FIGS. 1 and 1A.

Similarly, as shown in FIGS. 1B and 3, the gas expander operating chamber 62 is defined by an oval shaped cavity having contoured oval-shaped side walls 67 and opposed facing flat end walls 68. Continuous cylindrical-shaped guide grooves 69 are formed in the opposed interior surfaces of the flat end walls 68. The interior and exterior peripheral surfaces of the guide grooves 69 are raised above the flat end walls 68. As best seen in FIG. 3, the center "A" of the cylindrical-shaped guide grooves is concentric with the center of the oval-shaped chamber. The gas expander chamber 62 has an inlet port 70 through its side wall 67 positioned at an angle to allow entry the working fluid into the chamber tangential to the plane of rotation and a relatively large outlet port 71 which extends circumferentially along approximately one-half of the side wall and allows the working medium to exit tangential to the plane of rotation. The width of the inlet port 70 and outlet port 71 are approximately the same width as the interior of the steam expander chamber 62 to provide maximum filling of the volume of the chamber and minimize hydrodynamic loss. In FIGS. 1 and 1B, the inlet and outlet ports 70 and 71 are shown out of position for ease of understanding. A hollow arcuate water channel formed in the end walls 68 of the gas expander chamber 62 has an inlet and an outlet extending through the side walls 67 and defines a cooling jacket 129 for the gas expander chamber. The inlet port 70 is connected by a collector member 169 to the outlet of the vortex combustion chamber 121. The outlet port 71 of the gas expander chamber is connected by a diverging conduit 122,123 to the vortex heat exchanger/recuperator 64 and vortex boiler 78.

Figure 4:
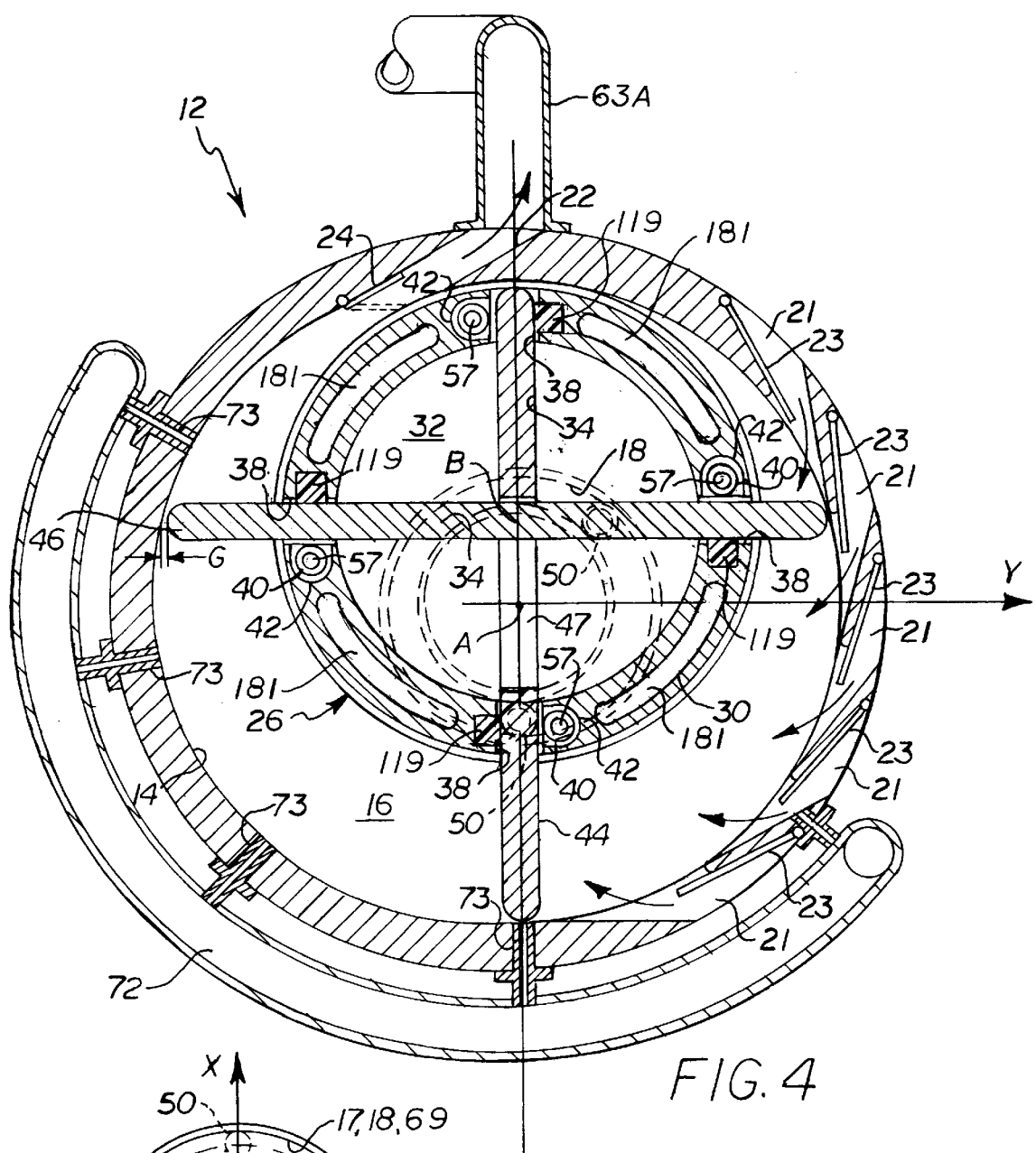
FIG. 4 is a vertical cross section through the air-water compressor chamber of the air-heat engine taken along line 4—4 of FIGS. 1, 1A, 13, and 13A.
Figure 4A:
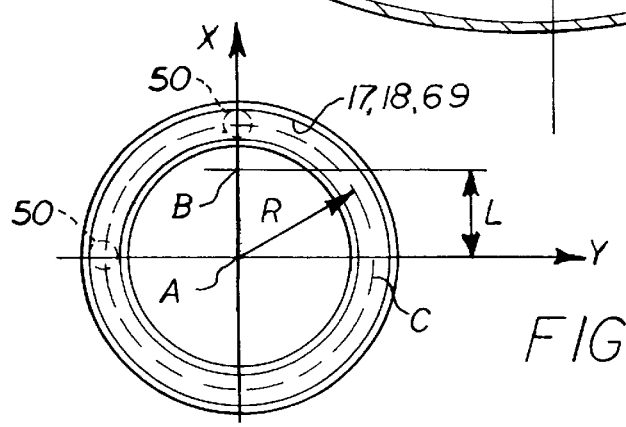
FIG. 4A is a partial elevation of the guide groove formed in the end walls of the gas and steam expander and air-water compressor chambers of the air-heat engine.

As best seen in FIGS. 1A and 4 the air-water compressor chamber 12 is also defined by an oval shaped cavity having contoured oval-shaped side walls 14 and opposed facing flat end walls 16. Continuous cylindrical-shaped guide grooves 18 are formed in the opposed interior surfaces of the flat end walls 16. The interior and exterior peripheral surfaces of the guide grooves 18 are raised above the flat end walls 16. As best seen in FIG. 4, the center "A" of the cylindrical-shaped guide grooves is concentric with the center of the oval-shaped chamber. The air-water compressor chamber 12 has a series of air intake ports 21 circumferentially spaced along approximately one-half of its side wall 14 each positioned at an angle to allow entry of air into the chamber tangential to the plane of rotation and an angular exhaust port 22 through its side wall which allows the air-water mixture exit tangential to the plane of rotation. The width of the air intake ports 21 and exhaust port 22 are approximately the same width as the interior of the air-water compressor chamber 12 to provide maximum filling of the volume of the chamber and minimize hydrodynamic loss.

Each of the air intake ports 21 is provided with a one-way valve 23 which allows air to flow only into the compressor chamber 12 and the exhaust port 22 is provided with a one-way valve 24 which allows air-water mixture to flow only out of the compressor chamber. An arcuate hollow water channel 72 is spaced a distance from the outside of the side wall 14 of the air-water compressor chamber 12. A series of circumferentially spaced water atomizers 73 extend radially between the water channel and the side wall 14 and join the interior of the water channel 72 and the interior cavity of the air-water compressor operating chamber 12 in fluid communication. The air intake ports 21 are not seen in FIGS. 1 and 1B. The exhaust port 22 is connected by a conduit 63A to the inlet port 74 of the vortex separator 63. (described below).

As shown in FIGS. 1, 1A, and 1B, a steam expander rotor 25, a gas expander rotor 27, and an air-water compressor rotor 26 are rotatably disposed in the respective steam and gas expander operating chambers 11, 62, and air-water compressor operating chamber 12.

Figure 5:
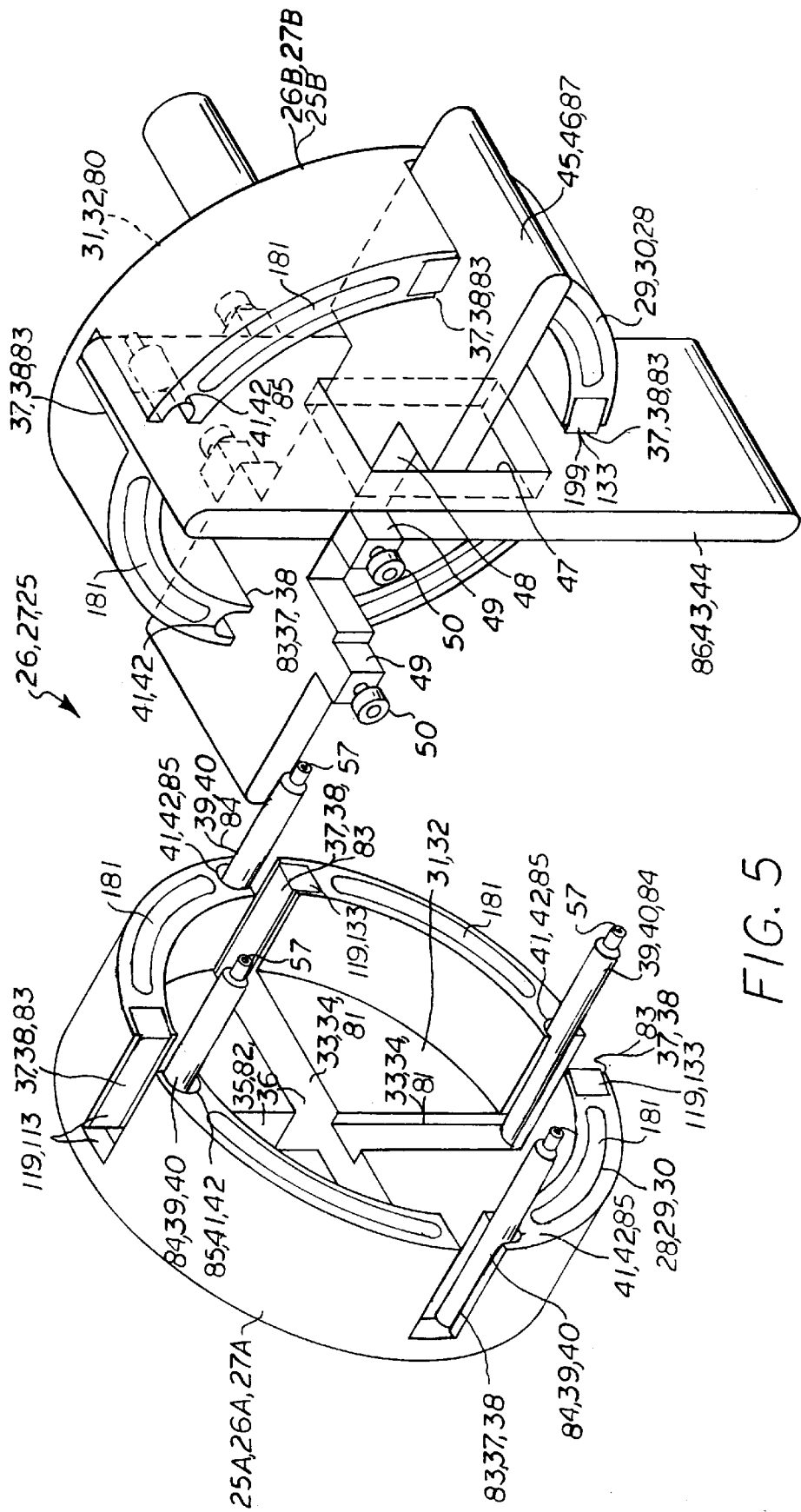
FIG. 5 is an exploded isometric view of the rotors of the air-water compressor and gas and steam expanders of the air-heat engine shown in an unassembled condition.
Figure 6:
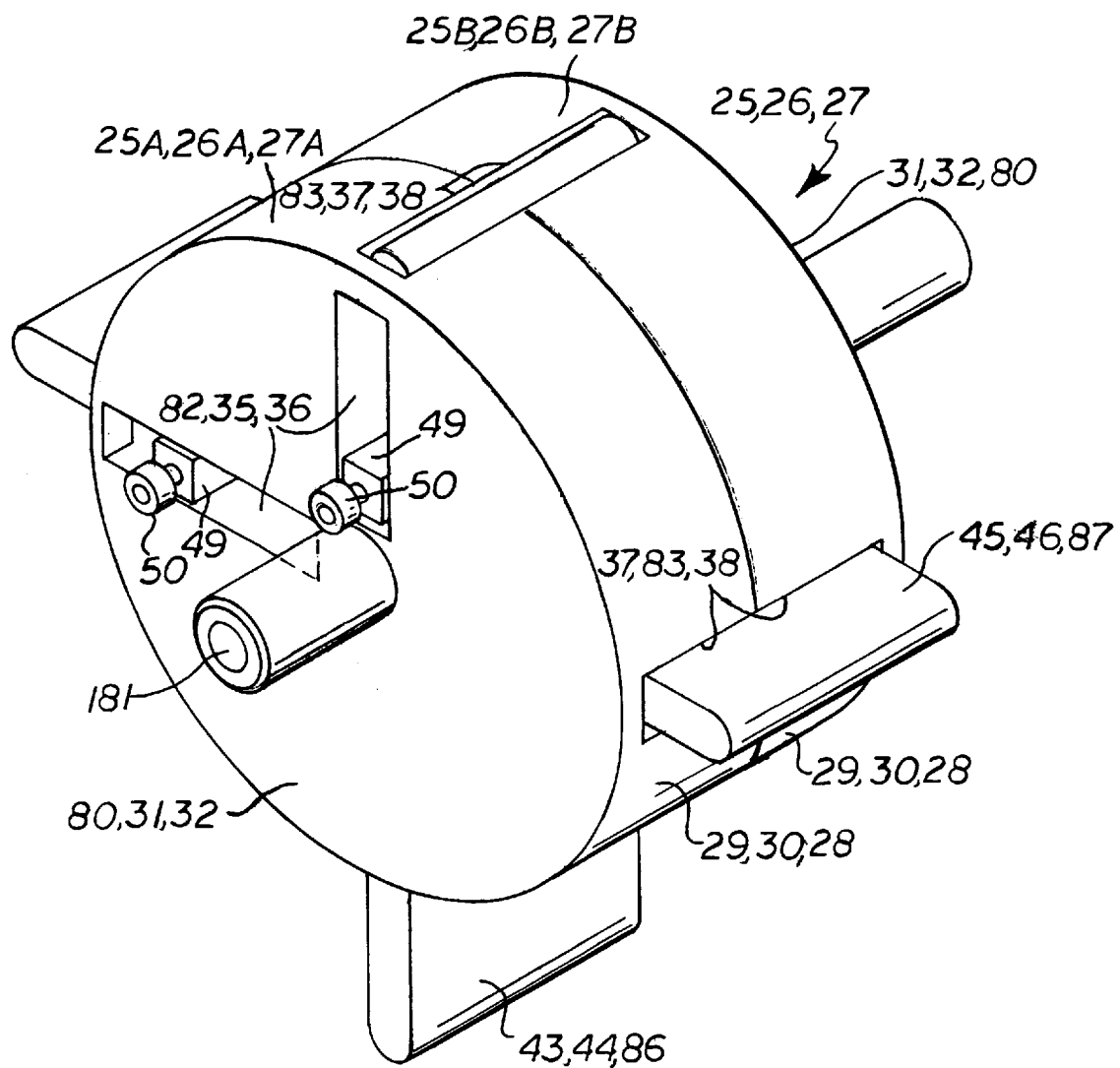
FIG. 6 is an isometric view of the air-water compressor and gas and steam expander rotors of the air-heat engine shown in an assembled condition.

Referring additionally to FIGS. 5 and 6, the rotors 25, 27, and 26 are of similar construction and in FIGS. 5 and 6 all three rotors are represented by a single figure. The steam expander and gas expander rotors 25 and 27 and air-water compressor rotor 26 are each formed by a pair of opposed hollow cylindrical members 25A–025B, 27A–27B, and 26A–26B, respectively, each having a circular side wall 29, 28 and 30 and an end wall 31, 80 and 32. A pair of perpendicular elongate rectangular slots 33, 81 and 34 are formed in the interior surface of the end walls 31, 80 and 32 of the cylindrical members 25A–25B, 27A–27B, and 26A–26B, and extend through the center of rotation of the cylindrical members. A portion of the slots 33, 81 and 34 on one side of the center of rotation extend all the way through the flat end walls 31, 80 and 32 of the cylindrical members 25A–25B, 27A–27B and 26A–26B to form a pair of rectangular perpendicular slots 35, 82 and 36 through the outer surface of the flat end walls 31, 80 and 32, as best seen in FIG. 5.

A series of circumferentially spaced rectangular slots 37, 83 and 38 extend through the circular side walls 29, 28 and 30 of the circular members 25A–25B, 27A–27B, and 26A–26B from their open end and terminate at the flat end walls 31, 80 and 32 in axial alignment with the slots 33, 81 and 34 in the flat end walls.

It should be noted that FIGS. 3, 4, and 5 show arcuate hollow water channels 181 in the side walls of the cylindrical members 27A–27B of the gas expander rotor 27 and the cylindrical members 26A–26B of the air-water compressor rotor 26. These water channels 181 are not provided in the rotors 27 and 26 used in the engine 10, but are provided in a modified engine 10A described hereinafter with reference to FIGS. 13–13B.

Rollers 39, 84 and 40 are mounted in recesses 41, 85 and 42 in the side walls 29, 28 and 30 of the cylindrical members 25A–25B, 27A–27B, and 26A–26B closely adjacent each slot 37, 83 and 38 with their curved exterior surface protruding a short distance into the slot opening (FIGS. 2, 3 and 4).

A pair of perpendicular elongate rectangular rigid blades 43,45 and 86,87 and 44,46, are slidably received in the elongate slots 33, 81 and 34, respectively. One blade 43, 86, and 44 of each pair is provided with a central rectangular opening 47 and the other blade 45, 87, and 46 of each pair is provided with a central narrow rectangular portion 48 which is received through the opening 47 such that the perpendicular blades 43, 86, 44, 45, 87, and 46 can slide independently relative to one another. A foot lug 49 extends outwardly a short distance from the opposed side edges of each blade 43, 86, 44, 45, 87, and 46 in opposed relation, and a roller 50 is rotatably mounted at the outer end of each lug.

As shown in FIG. 6, the circular members 25A–25B, 27A–27B, and 26A–26B are secured together in opposed relation over the blades 43, 86, 44, 45, 87, and 46 to form a circular drum configuration. The outer ends of the blades 43, 86, 44, 45, 87, and 46 extend slidably through the slots 37, 83, and 38 in the circular side walls 29, 28, and 30 and are supported on opposed sides by the rollers 39, 84, and 40 as seen in FIG. 2, 3 and 4. In the assembled condition of rotors 25, 27, and 26, as shown in FIG. 6, the lugs 49 and rollers 50 extend through the slots 35, 82, and 36 in the flat end walls 31, 80, and 32 and the rollers 50 are received and travel in the continuous guide grooves 17 and 69 in the opposed interior surfaces of the flat end walls 15 and 68 of the steam and gas expander operating chambers 11 and 62, and in the opposed interior surface 16 of the air-water compressor operating chamber 12, respectively, as seen in FIGS. 1A and 1B.

Referring again to FIGS. 1A and 1B, a lubricant is supplied to the rollers 39, 84, 40 and 50 through lubricators 88 and channels 89. An elastomeric seal collar 51 is installed on the raised interior and exterior peripheral surfaces of the guide grooves 17 and 18 of the steam expander operating chamber 11 and air-water compressor operating chamber 12 and forms a fluid sealing relation against the exterior surfaces of the end walls 31 and 32 of the cylindrical rotor members 25 and 26.

A graphite seal collar 131 is installed on the raised interior and exterior peripheral surfaces of the guide grooves 69 of the gas expander operating chamber 62 and forms a fluid sealing relation against the exterior surface of the end walls 80 of the cylindrical rotor member 27.

An elastomeric seal 118 is installed in annular grooves formed in opposed inward facing surfaces of the flat end walls 15 and 16 of the steam expander operating chamber 11 and the air-water compressor operating chamber 12, respectively. These seals form a peripheral fluid sealing relation between stationery walls 15 and 16 and rotating flat end walls 31 and 32 of the cylindrical rotor members 25 and 26, respectively.

A spring-loaded graphite seal 132 is installed in annular grooves formed in opposed inward facing surfaces of the flat end walls 68 of the gas expander operating chamber 62 and form a peripheral fluid sealing relation between stationary walls 68 and rotating flat end walls 80 of the cylindrical rotor member 27.

As best seen in FIGS. 2, 4 and 5, generally L-shaped elastomeric seals 119 are installed in slots 37 and 38 adjacent the rollers 39 and 40 and in grooves at the outer ends of slots 33 and 34 of the cylindrical members 25A–25B and 26A–26B of the steam expander rotor 25 and air-water compressor rotor 26, respectively. These seals enclose the sliding blades on three sides and form a fluid sealing relation between stationery surfaces of slots 37, 38 and slots 33, 34 of the cylindrical members 25A–25B and 26A–26B and the moving surface of the blades opposite the rollers 33 and 40 and also seal the edge surfaces of the blades.

As best seen in FIGS. 3, 4 and 5, generally L-shaped graphite seals 133 are installed in slots 83 adjacent the rollers 84 and in grooves at the outer ends of the slots 81 of the cylindrical members 27A–27B of the gas expander rotor 27. These seals enclose the sliding blades on three sides and form a fluid sealing relation between stationery surfaces of slots 83 and 81 of the cylindrical members 27A–27B and moving surface of the blades opposite the rollers 84 and also seal the edge surfaces of the blades.

As best seen in FIGS. 1A and 1B, a shaft 52 secured to the exterior of the flat end wall 80 of the gas expander rotor 27 extends outwardly from its center through a hole in the end wall 68 of the gas expander chamber 62 and a coaxial opposed shaft 53 secured to the exterior of the opposed flat end wall 80 of the rotor 27 extends outwardly from its center through a hole in the opposed end wall 68 of the gas expander operating chamber 62. A shaft 54 secured to the exterior of the flat end wall 31 of the steam expander rotor 25 extends outwardly from its center through a hole in the end wall 15 of the steam expander operating chamber 11, and a coaxial opposed shaft 55 secured to the exterior of the opposed flat end wall 31 of the rotor 25 extends outwardly from its center through a hole in the opposed end wall 15 of the steam expander operating chamber 11.

Similarly, a shaft 56 secured to the exterior of the flat end wall 32 of the air-water compressor rotor 26 extends outwardly from its center through a hole in the end wall 16 of the air-water compressor chamber 12 and a coaxial opposed shaft 57 secured to the exterior of the opposed flat end wall 32 of the rotor 26 extends outwardly from its center through a hole in the opposed end wall 16 of the air-water compressor chamber 12 and has a drive a pulley 117 secured to its outer end. The shafts 52, 53, 54, 55, 56 and 57 are journalled in the engine housing by bearings 60 and packed by glands 61. The shaft 53 of the gas expander rotor 27 is joined to the shaft 54 of the steam expander rotor 25 and the shaft 55 of the gas expander rotor 25 is joined to the shaft 54 of the air-water compressor rotor 26 by splines or other suitable means such that the rotors rotate together.

When the gas expander, steam expander, air-water compressor rotors 27, 25, and 26 turn, the blades 43, 45, 86, 87, 44, and 46 reciprocate radially riding on the rollers 84, 39, and 40 mounted in the walls 29, 28, and 30 of the cylindrical members 25A–25B, 27A–27B, and 26A–26B to form four vane blades of variable length in the respective operating chamber and function as pistons during the compression and expansion of the working medium. The radial travel of the blades 43, 86, 44, 45, 87, and 46 is regulated by the guide grooves 69, 17, and 18 in which the rollers 50 at the ends of the lugs 49 of each blade travel.

As shown in FIGS. 2, 3, 4, and 4A, the centerline "B" of the shafts 52–57 and rotors 25, 27 and 26 is eccentrically offset a distance "L" from the center of the oval-shaped gas expander, steam expander and air-water compressor chambers 62, 11 and 12, and their guide grooves 69, 17, and 18, respectively. The sliding blades 43, 86, 44, 45, 87, and 46 of the gas expander rotor 25, steam expander rotor 27, and air-water compressor rotor 26 are of a predetermined length to provide a constant minimum clearance gap "G" between the outer tip ends of the blades and the interior surface of the oval side walls 67, 13, and 14 of the gas expander chamber 62, steam expander chamber 11 and air-water compressor chamber 12, respectively.

In a preferred embodiment, the centerline "C" of the guide grooves 69, 17, and 18 in the rotation plane of the gas expander, steam expander and air-water compressor rotors 27, 25, and 26 is the circuit with the radius "r". This radius "r" must be greater than the eccentricity "L". The centerline "C" of the cylindrical guide grooves is defined by the equation: $x^2+y^2=r^2$; where x and y=the vertical and horizontal coordinates, r=the circuit radius, and L=eccentricity of the center of rotor rotation relative to the central axis of the chamber and guide grooves.

The inner surface of the oval side walls of the gas expander chamber 62, steam expander chamber 11 and air-water compressor chamber 12 in the rotation plane of the rotors are calculated and configured according to the equation:

$$\frac{X^2}{h^2} + \frac{y^2}{(h+1/4L)^2 - L^2} = 1$$

Where x and y=coordinates,
 h=half of vane length=half of large oval axis, and
 L=eccentricity.

As best seen in FIG. 1A, the vortex separator 63 is a generally cylindrical member enclosed at its top and bottom ends and having a larger diameter at the bottom. The vortex separator 63 has a tangential inlet port 74A extending through the upper end of its side wall which allows a high pressure air-water mixture from the air-water compressor 12 to enter tangentially into the separator 63, a tangential water outlet port 74B extending through the lower end of its side wall, and a central air outlet 74C extending through its top wall. In the separator 63 the air and water are divided or stratified by centrifugal force. Water exits through the tangential water outlet 74B and air exits through the central air outlet 74C. The water outlet 74B is connected by a conduit 76 to the inlet of the cooling jacket 129 of the gas expander chamber 62. The water conduit 76 has a throttle 137. The air outlet 74C is connected by a conduit 75 to the inlet port 77 of the vortex heat exchanger/recuperator 64.

Referring now to FIG. 1C and additionally to FIGS. 7–9, the vortex heat exchanger/recuperator 64 and vortex boiler 78 will be described. The vortex heat exchanger/recuperator 64 and vortex boiler 78 are of similar construction. In the following description, the parts which are common to both are given the same numerals of reference. Each has a hollow cylindrical outer housing 136 enclosed at the top end by an and plate 104. The upper end of the outer housing 136 of the vortex heat exchanger/recuperator 64 is connected to the diverging end 122 of the conduit 122 and the upper end of the outer housing 136 of the vortex boiler 78 is connected to the diverging end 123 of the conduit 122 joining them to the outlet port 71 of the gas expander operating chamber 62 to receive waste heat from the working gas. The lower end of the outer housings 136 are provided with an exhaust port 128. The exhaust port 128 of the heat exchanger/recuperator 64 is connected in fluid communication to the interior of the outer housing of the vortex boiler 78. A hollow cylindrical heat transfer pipe 138 is secured within the outer housing 136 of the vortex heat exchanger/recuperator 64 and the vortex boiler 78.

The interior diameters 139 of the outer housings 136 are larger than the exterior diameters 140 of the heat transfer pipes 138 and the annulus or annular ring channels between them serves as an outer heating jacket 124. The annular ring channels 124 are joined at one end in communication with the conduits 122, 123 to receive the waste heat of the working gas and are in communication with the exhaust port 128 at their other end. The outer housings 136 are not shown in FIG. 7.

A first generally disk-shaped nozzle 90 is secured to the interior of the heat transfer pipe 138 a distance above its upper end and a second generally disk-shaped nozzle 93 is secured to the interior of the heat transfer pipes 138 at its lower end. The lower portion of the nozzle 93 extends downwardly and curves radially outward from the bottom of the heat transfer pipe 138 and is joined to the interior of the outer housing 136, enclosing the lower end of the outer heating jacket 124. The interior of the nozzle 93 serves as an outlet channel. The outlet of the heat exchanger/recuperator 64 being designated by 115 and the outlet of the boiler 78 being designated by 79. Third and fourth generally disk-shaped nozzles 91 and 92 positioned back-to-back are secured to the interior of the heat transfer pipe 138 in longitudinal vertically spaced relation to the first and second nozzles 90 and 93. Each nozzle has a circular peripheral side wall, a central conical extension and a central bore with a concave curved surface 94 extending between the peripheral side wall and the base of the conical extension. The nozzles 90–93 are provided with a series of circumferentially spaced apertures through which a series of heat tubes 95 (described below) extend.

The conical extension and curved surface 94 of the first and second nozzles 90 and 93 at the upper and lower end, respectively, of the heat transfer pipe 138 are disposed in vertically opposed inward facing relation. The conical extension and curved surface 94 of the third and fourth nozzles 91 and 92 positioned back-to-back are disposed in vertically opposed outward facing relation toward the first and second nozzles 90 and 93. The first nozzle 90 near the upper end of the heat transfer pipe has an inwardly contoured surface 96.

Figure 7:
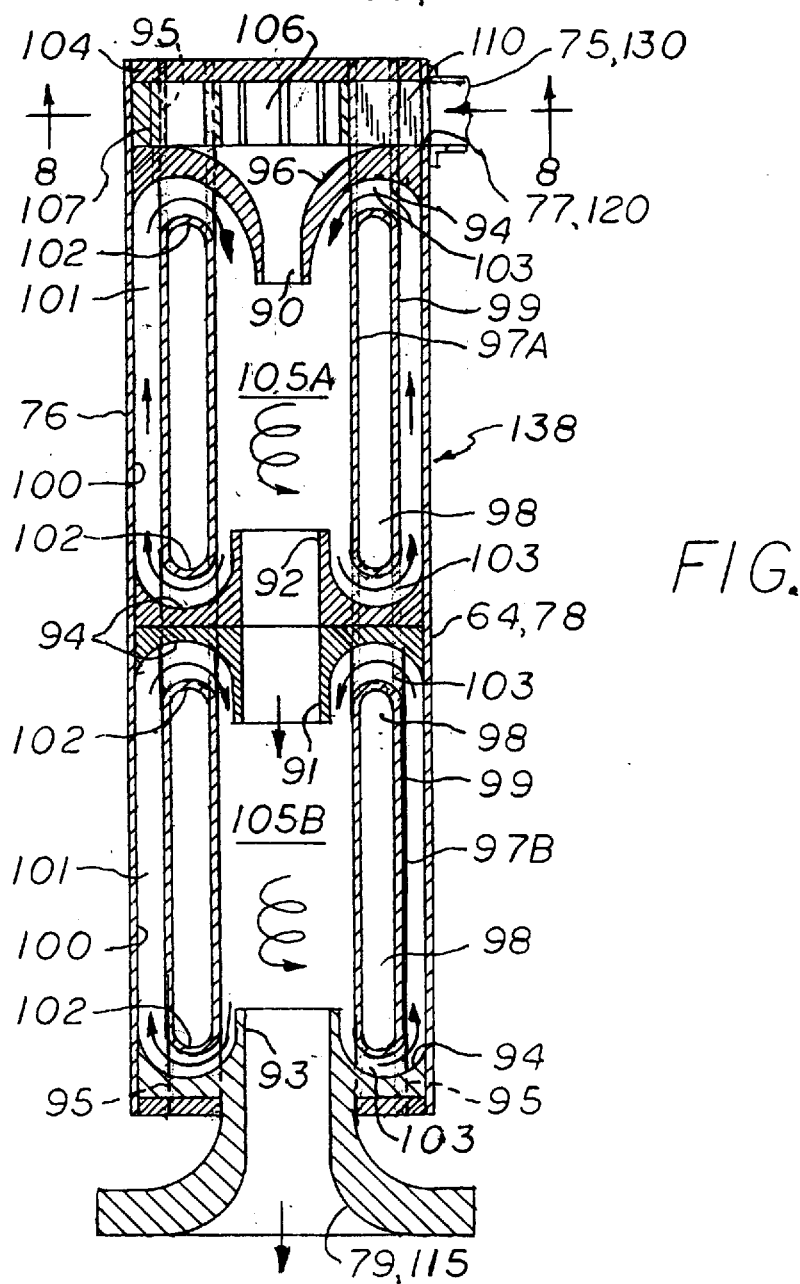
FIG. 7 is a cross section of the heat transfer section of the vortex heat exchanger/recuperator and boiler taken along line 7—7 of FIGS. 1 and 1C, shown without the outer housing.

Upper and lower elongate hollow toroids 97A and 97B each having elongate hooped interior cavities 9B are positioned in vertically spaced relation along the length of the interior of the heat transfer pipe 138 between the nozzles 90, 91, 92, and 93, respectively (FIG. 7). The outer periphery 99 of the toroids 97A and 97B is smaller in diameter than the interior diameter 100 of the heat transfer pipes 138 to define an annular ring channel 101 therebetween. The rounded ends 102 of the toroids 97A and 97B are spaced a distance from the curved surfaces 94 of the nozzles to define curvilinear channels 103 which are in communication with the annular ring channel 101 and the central bores of the nozzles 90, 91, 92, and 93. The annular ring channel 101 and curvilinear channels 103 between the curved surfaces 102 and 94 define oblong looped recirculation channels. The looped recirculation channels in cooperation with the nozzles 86, 87 form ejectors with a feedback loop.

The elongate hooped interior cavities 98 of the toroids 97A and 97B are connected in communication with a series of circumferentially spaced heat tubes 95 which extend the length of the heat transfer pipe 134 from the heat channels 122, 123 to the exhaust port opening 128 (FIGS. 1C, 7 and 8). The interior cavities 98 of the toroids 97 and heat tubes 95 serve as an inner heating jacket. The upper ends of the heat tubes 95 extend through the top plate 104 at the upper end of the heat transfer pipe 138.

The interior of the heat transfer pipe 138 in cooperation with the nozzles 90, 91, 92 and 93 forms lower chambers 105A and 105B and an upper vortex chamber 106. An inlet port 77 extends through the side wall of the heat transfer pipe 138 of the heat exchanger/recuperator 64 and is positioned to pass fluid tangentially into its vortex inlet chamber 106. An inlet port 120 extends through the side wall of the heat transfer pipe 138 of the boiler 78 and is positioned to pass fluid tangentially into its vortex inlet chamber 106. The inlet port 77 of the heat exchanger/recuperator 64 is connected by the air conduit 75 to the air outlet 74C of the vortex separator 63. The inlet port 120 of the vortex boiler 78 is connected by a water conduit 130 to the outlet of the water cooling jacket 129 of the gas expander chamber 62.

Figure 9:
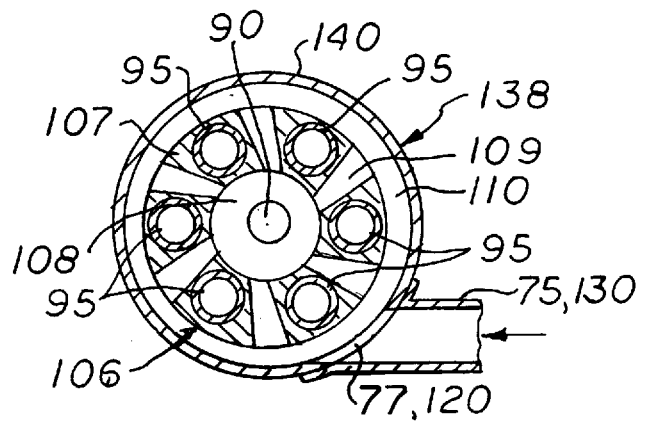
FIG. 9 is a vertical cross section through the vortex heat exchanger/recuperator and boiler of the air-heat engine taken along line 9—9 of FIG. 7.

As best seen in FIGS. 8 and 9, a generally disk-shaped guide member 107 is secured in the upper end of the heat transfer pipes 138 beneath the end plate 104 and has a central bore 108 and circumferentially spaced apertures through which the upper portions of the heat tubes 95 extend. The guide member 107 has a series of channels 109 which extend tangentially outward from the central bore 108 to the periphery of the guide member. The space between the outer periphery of guide member 107 and the interior 100 of the heat transfer pipe 138 defines an annular ring distribution channel 110 adjacent the inlet port 77 of the vortex separator 63 through which compressed cold air from the heat exchanger/recuperator 64 is introduced tangentially via conduit 75 and adjacent the inlet port 120 of the vortex boiler 78 through which water from the cooling jacket 129 of the gas expander 62 is introduced tangentially via conduit 130. The outlet channel 79 of the vortex boiler 78 is connected to the inlet port 19 of the steam expander chamber 11 by conduit 134.

As best seen in FIGS. 1C and 9, air entering the vortex heat exchanger/recuperator 64 from the separator 63 is preheated by exhaust gases and is conducted through the outlet channel 115 of heat exchanger/recuperator 64 to the pre-combustion chamber 116 of the vortex combustion chamber 121 (described below). Water entering the vortex boiler 78 from the water cooling jacket 129 of the gas expander 62 heated to steam by exhaust gases and the steam is conducted through the outlet channel 79 of the boiler to the inlet 19 of the steam expander chamber 11.

Figure 10:
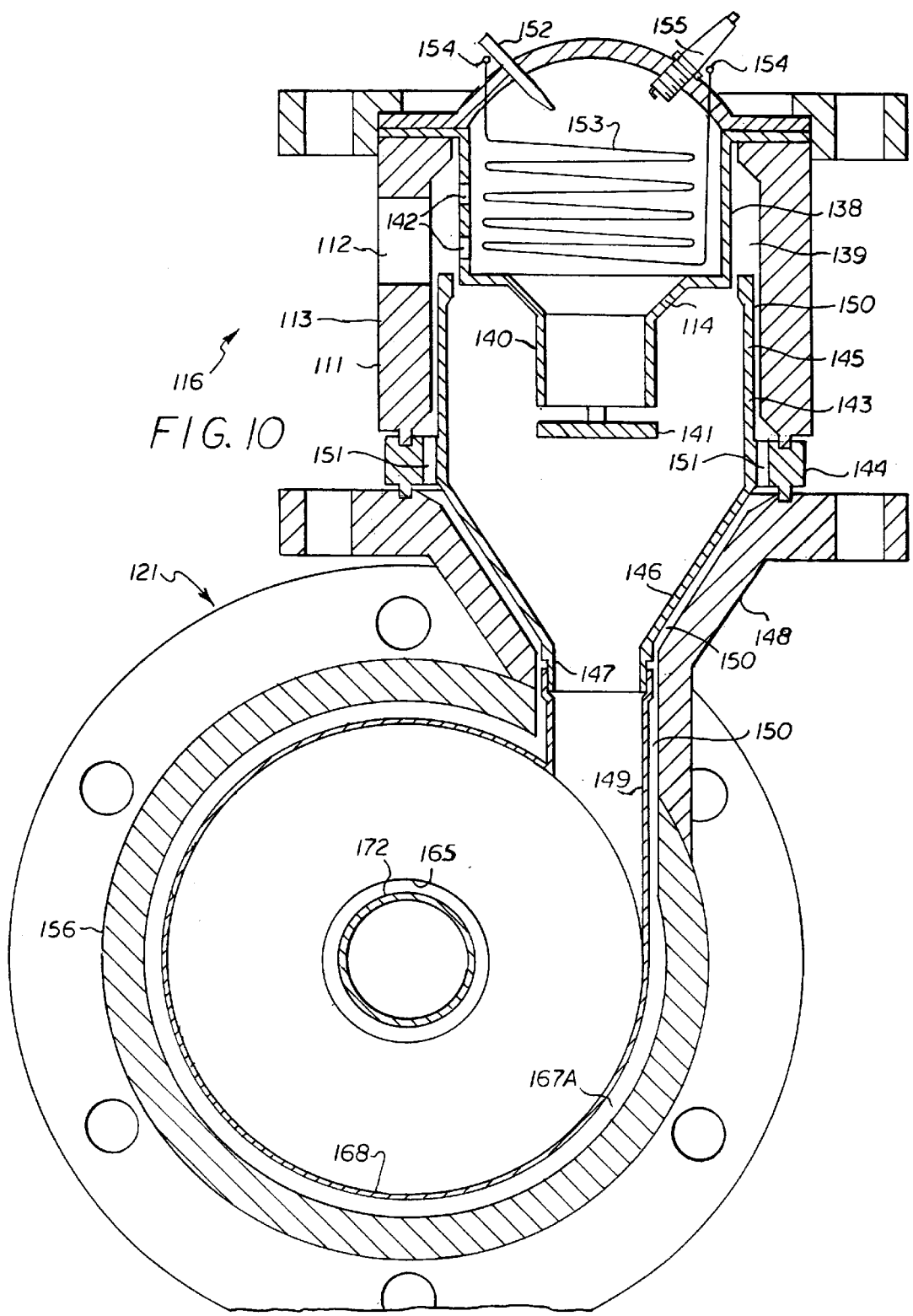
FIG. 10 is a horizontal cross section through the precombustion chamber and vortex combustion chamber of the air-heat engine.

Referring again to FIG. 1B, and additionally to FIGS. 10 and 11, the vortex combustion chamber 121 and pre-combustion chamber 116 will be described. The vortex combustion chamber 121 is connected to a straight-flow pre-combustion chamber 116. The pre-combustion chamber 116 is used for forming a super-rich fuel and air mixture, ignition, partial combustion and pirolision of heavy and low grade fuels.

The pre-combustion chamber 116 has a hollow cylindrical outer housing 111 enclosed at one end, with an air inlet 112 through its side wall 113. A hollow cylindrical combustion stabilizer 114 is secured within the outer housing 111 and has a large diameter side wall 138 spaced radially inward from the outer housing defining an annulus 139 therebetween and has a reduced diameter neck portion 140 at one end and a disk-shaped member 141 positioned a distance from the neck portion. A plurality of air inlet ports 142 extend through the larger diameter side wall 138 in communication with the air inlet 112 of the outer housing 111.

A funnel-shaped flame tube 143 is secured to the open end of the outer housing 111 by a radial flange 144 and has a hollow cylindrical side wall portion 145 received within the open end of the outer housing 111, a conical side wall portion 146, and a reduced diameter neck portion 147 at one end. The radial flange 144 is secured between the open end of the outer housing 111 and a conical flanged fitting 148 on the outer housing of the vortex combustion chamber 121. The conical side wall portion 146 of the flame tube 143 is received within the conical flanged fitting 148 and the reduced diameter neck portion 147 is connected with a tubular channel 149 disposed tangential to the periphery of the vortex combustion chamber 121.

The exterior of the cylindrical side wall portion 145 is spaced radially inward from the interior of the outer housing 111 and the conical side wall portion 146 and reduced neck portion 147 is spaced radially inward from the interior of the conical flanged fitting 148 to define an annulus 150 therebetween. A plurality of passageways 151 extend through the radial flange 144 to allow communication through the annulus 150.

The combustion stabilizer 114 is provided with a fuel injector 152, a fuel vaporizer 153 having terminals 154 extending from the pre-combustion chamber 116 which are connected with a source of electrical current (not shown), and fuel igniter or spark plug 155. A portion of air from the general air flow is drawn into the combustion stabilizer 114 through opening 112 and air inlets 142 to create an air-fuel mixture near the spark plug 155. The fuel vaporizer 153 is used to start the engine in cold seasons if a heavy fuel is used.

As best seen in FIG. 11, the vortex combustion chamber 121 receives a super-rich mixture of fuel and air formed in the pre-combustion chamber 116 and partially burned and pirolised products for after-burning. The vortex combustion chamber 121 has a cylindrical outer housing 156 enclosed at the bottom end by outer bottom end wall 157 and at the top end by outer top wall 158. An inner bottom wall 159 and an inner top wall 160 are secured within the outer bottom and top walls 157 and 158 in spaced apart relation to define a flow passageway 161 therebetween. A swirl nozzle 162 is secured in the passageway 161 between the outer bottom wall 157 and inner bottom wall 159. A plurality of passageways 163 extend longitudinally through the side wall of the cylindrical outer housing 156 to allow communication through the flow passageway 161. Passageways 164 extend radially inward from the exterior of the outer top wall 158 in communication with the flow passageway 161.

The inner top wall 158 is provided with a central opening 165 in communication with the flow passageway 161 and radial passageways 164. A bypass conduit 166 connects the radial passageway 164 to the compressed air flow entering the recirculation system of combustion chamber 121 from the conduit 75 of vortex separator 63 by a conduit 175. In a modification described hereinafter, the water cooling jacket 129 of the gas expander chamber 62 may be connected to the conduit 175 by a conduit 177 containing a throttle 178 to mix a portion of the water with the air entering the combustion chamber through bypass conduit 166.

A perforated liner 167 is secured to the interior surfaces of the cylindrical outer housing 156, inner bottom wall 159 and inner top wall 160. The cylindrical side wall 168 of the liner 167 is joined tangentially to the tubular channel 149 and serves as a cylindrical heat tube. The annulus between the cylindrical outer housing 156 and cylindrical side wall 168, between inner bottom wall 159, inner top wall 160 and the perforated liner 167 with the openings 176 serves as a cooling jacket 167A. The cooling jacket 167A is in communication with the annulus 150. The fuel and air rich mixture with partially burned and pirolised products from the pre-combustion chamber 116 is caused to swirl as it enters the interior of the vortex combustion chamber 121 through the tubular channel 149.

The vertically opposed interior surfaces of the liner 167 and the inner top wall 16 and inner bottom wall 159 have opposite facing, outwardly concave, curved surfaces with the axial distance between the curved surfaces increasing inversely from their periphery with respect to the radial distance. In a preferred embodiment, the vertically opposed interior surfaces of the liner 167 are curved or contoured according to the following equation to provide constant vortex radial velocity conditions to insure minimal hydrodynamic losses and confine unvaporized fuel droplets in equilibrium in the orbit with consideration for variable temperature from periphery to center:

$$\left(KM_t^2 \frac{T_o}{T} \frac{r_o^2}{r^2} + 1\right) \frac{dr}{r} + \frac{dh}{h} - \frac{dT}{T} = 0$$

Where K=adiabatic exponent,

M_t=Mach number based on tangential velocity at maximal radius of combustion chamber cavity, $T_o$=initial vortical stream temperature at maximal vortex radius, T=current vortical stream temperature at current vortex radius, $r_o$=maximal radius of combustion chamber cavity, h=current distance between end walls, and r=current radius of combustion chamber cavity.

The optimal end wall profile, h=h(r) can be determined from this equation for any given radial temperature distribution.

A collector member 169 is secured to the outer top wall 158 of the vortex combustion chamber 121. The collector member 169 has a top flange 170 and a central bore 171 which is connected to the inlet port 70 of the gas expander operating chamber 62 and a tubular extension 172 which extends upwardly therefrom through the central opening 165 in the inner top wall, defining an annulus 173 therebetween, and terminates at approximately the center of the vortex combustion chamber. The juncture of the tubular extension 172 and the top flange 170 is contoured and has an annular raised lip ring 174 which extends angularly upwardly therefrom and a distance into the passageway 161 between the inner top wall 160 and outer top wall of the vortex combustion chamber 121. The interior of the tubular extension 172 serves as the outlet pipe for the near-axis zone of the vortex combustion chamber 121. The passageways 161, 163 and 164 form an isolated fuel-air recirculation channel which passes around the interior of the vortex combustion chamber 121.

As described hereinafter, a portion of the cool and moist air from the vortex separator 63 via the pipe 175 (and in the modification, some portion of water from the cooling jacket 129 via the conduit 177 and throttle 178) is directed through the bypass conduit 166 and the radial passageways 164 onto the annular raised lip ring 174 which serves as a fuel-air ejector ring and causes a venturi effect to return trapped fuel film through the recirculation channel 161, 163, 164 and swirl nozzle 162 back into the chamber combustion zone. The swirl nozzle 162 swirls the recirculated fuel-air-water mixture flowing through the recirculation channels 161, 163, 164 as it enters the interior of the vortex combustion chamber 121. Because the swirl nozzle 162 is located in the near-axis zone of the vortex combustion chamber 121 where re-refraction occurs, the fuel-air ejector ring 174 is subjected to substantial pressure drop and its operation is intensified.

High-temperature gas from the combustion chamber 121 enters the gas expander operating chamber 62 through the inlet port 70, performs useful expansion work and passes through the outlet port 71 and conduits 122, 123 to an outer heating jacket 124 and inner heating jacket 126, of the heat exchanger/recuperator 64 and boiler 78, respectively, and gives off waste heat to cold compressed air in heat exchanger/recuperator 64 and evaporates water in the boiler 78 and is vented to atmosphere through exhaust port 128.

The water conduit 76 is connected with the cooling jacket 129 of the gas expander operating chamber 62 from where heated water via conduit 130 arrives into inlet port 120 of the boiler 78. The water conduit 76 has a throttle 137 for controlling the amount of water entering the water cooling jacket 129. The inlet port 19 of the steam expander chamber 11 is connected with the outlet channel of the vortex boiler 78 by a conduit 134, and the outlet port 20 of the steam expander chamber 11 is connected to the radiator/condenser 65 by a conduit 135. Water from the radiator/condenser 65 is delivered by the pump 66 into the water conduit 72 via conduit 65A and injected through the water atomizers 73 into the air-water compressor operating chamber 12.

FIG. 12 is a block diagram showing the flow path of the various fluids during the operation of the air-heat engine 10. As the rotor of the air-water compressor 12 rotates, ambient air is drawn into the air-water compressor and mixed with fine dispersed cool water from the radiator/condenser 65 pumped through the water injectors by pump 66 and the mixture is isothermally compressed in the air-water compressor. The compressed cool air and water mixture is discharged into the separator 63 where the cool air is separated from the water and supplied to the vortex heat exchanger/recuperator 64 where it is preheated using waste heat from the gas expander 62 and the preheated air is discharged into the vortex pre-combustion chamber 116 and then into the vortex combustion chamber 121. A portion of the cool air from the separator 63 may be introduced into combustion chamber 121 by conduit 175 for the purpose of complementary reducing the burning temperature. Heated air from the combustion chamber 121 enters the gas expander chamber 62 where it is adiabatically expanded performing useful work and causing simultaneous rotation of the steam expander rotor connected by shafts 53 and 54 and the air-water compressor rotor connected by shafts, 55 and 56. Spent working fluid from the gas expander 62 is supplied as waste heat to the vortex heat exchanger/recuperator 64 isobarically giving up its waste heat to the air and is discharged through its exhaust port into the lower end of the vortex boiler 78. Separated water from the separator 63 enters the cooling jacket of the gas expander chamber 62 and is discharged into the vortex boiler 78 and is discharged as steam into the steam expander chamber 11 and during the vapor cycle performs useful work in rotating the steam expander rotor and the rotor of the air-water compressor 12. The spent steam is conducted to the radiator/condenser 65 where it is condensed and cooled and then injected into the air-water compressor operating chamber 12 completing the cycle.

Figure 13A:
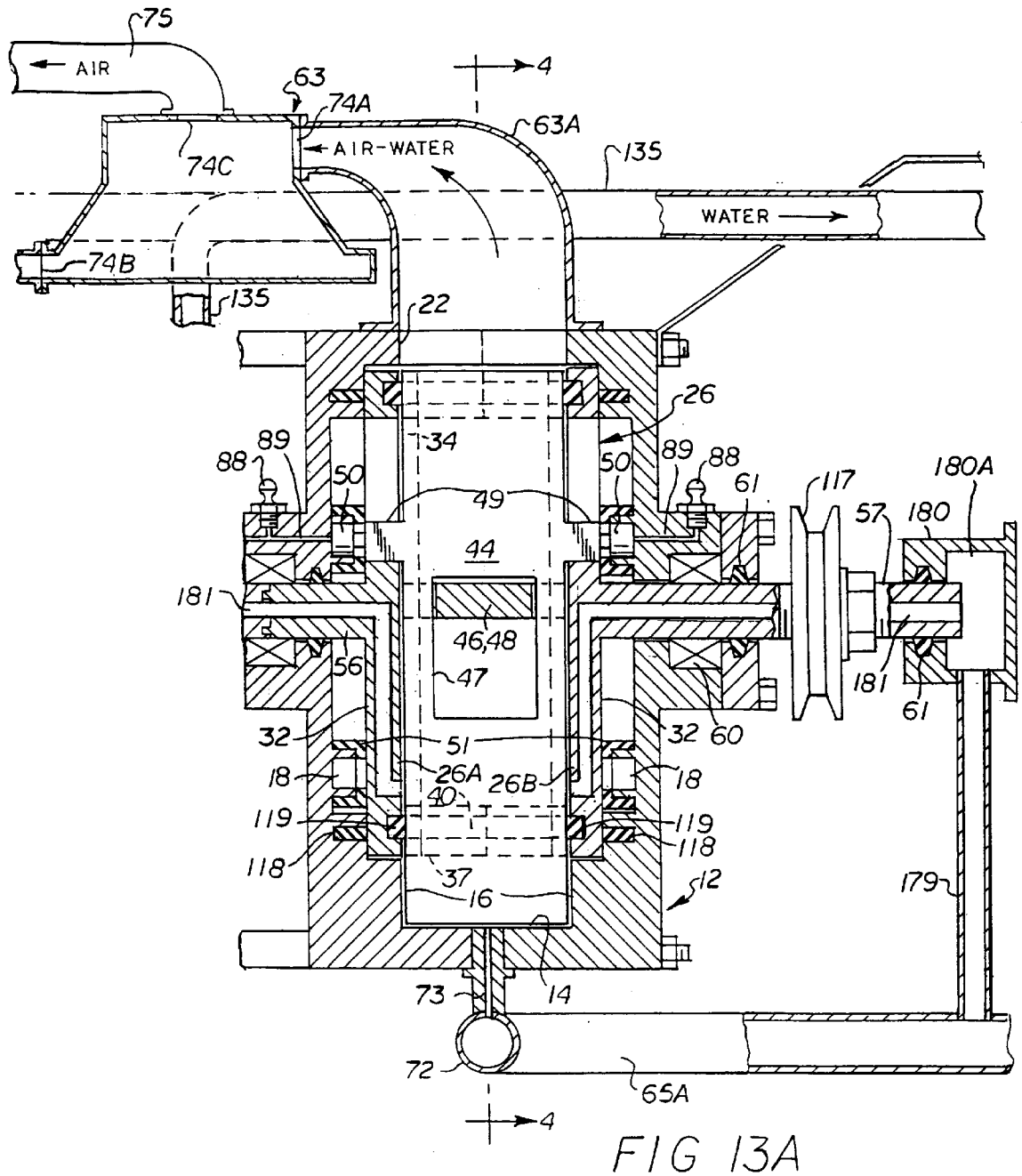
FIGS. 13A and 13B are vertical cross sections of the air-heat engine of FIG. 13 without the vortex boiler and steam expander, shown in larger scale.
Figure 13B:
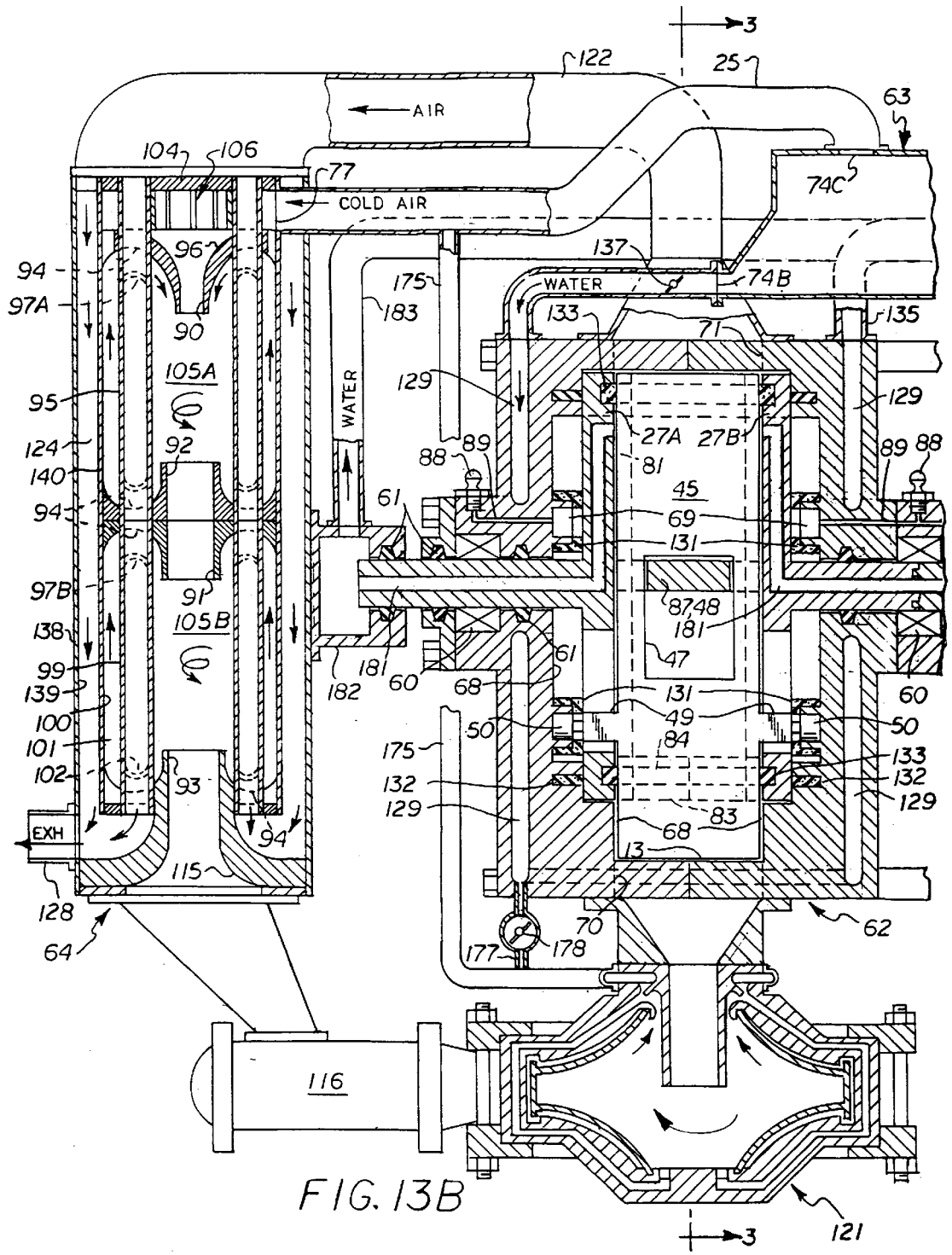

Referring now to FIGS. 13, 13A and 13B of the drawings, there is shown a modification of the air-heat engine 10A with isothermal air compression which does not utilize the boiler and steam expander and operates without the Rankine cycle.

In the following description, only the components which are modified are described in detail The rotors, operating chambers and other components of the gas expander and air-water compressor which are not modified are the same as previously described and are given the same reference numerals. However, the detailed description of the unmodified components will not be repeated to avoid repetition. The air-heat engine 10A has an oval-shaped gas expander operating chamber 62 and an adjacent air-water compressor chamber 12, vortex separator 63, vortex heat exchanger/recuperator 64, vortex combustion chamber 121 with pre-combustion chamber 116, and the steam expander 62 and boiler 64 are eliminated.

In this modification of the air-heat engine 10A, the side walls of the cylindrical members 27A–27B of the gas expander rotor 27 and the cylindrical members 26A–26B of the air-water compressor rotor 26 are provided with arcuate hollow water channels 181 (FIGS. 3, 4, and 5) in fluid communication with a hollow water channel 181 formed through the shafts 52, 53, 56, and 57 (FIGS. 13A and 13B). The water cooling jacket 129 of the gas expander chamber 62 is connected to the conduit 175 by a conduit 177 containing a throttle 178 to mix a portion of the water with the air entering the combustion chamber through bypass conduit 166.

Cylindrical water chambers 180 and 182 having a central cavity 180A are installed on the outer ends of the shafts 52 and 57 and packed by glands 61. Water enters directly into the cooling jacket 129 of the gas expander chamber 62 from the separator 63 via conduit 76 and returns from the water jacket 129 into the radiator/condenser 65 via conduit 135. The gas expander rotor 27 is cooled by water delivered by the pump 66 from radiator/condenser 65 through a conduit 179 which passes through the water chamber 180A and water channel 181, through shaft 57, through the air-water compressor rotor 26, through shafts 56 and 53, through the gas expander rotor 27, through shaft 52 and into the water cavity of the water chamber 182, and returns to the radiator/condenser 65 through conduits 183 and 135.

The simplified engine 10A shown in FIG. 13–13B with the steam expander and vortex boiler and the Rankine cycle eliminated may be used advantageously for moderate power transportation engines (automotive for example), wherein the water is used only for isothermal compression of air and cooling of the gas expander operating chamber.

FIG. 14 is a block diagram showing the flow path of the various fluids during the operation of the modified air-heat engine 10A. As the rotor of the air-water compressor 12 rotates, ambient air is drawn into the air-water compressor and mixed with fine dispersed cool water from the radiator/condenser 65 pumped through the water injectors by pump 66 and the mixture is isothermally compressed in the air-water compressor. The compressed cool air and water mixture is discharged into the separator 63 where the cool air is separated from the water and supplied to the vortex heat exchanger/recuperator 64 where it is preheated using waste heat from the gas expander 62 and the preheated air is discharged into the vortex pre-combustion chamber 116 and then into the vortex combustion chamber 121. Heated air from the combustion chamber 121 enters the gas expander chamber 62 where it is adiabatically expanded performing useful work and causing simultaneous rotation of the air-water compressor rotor connected by shafts 53 and 56. Spent working fluid from the gas expander 62 is supplied as waste heat to the vortex heat exchanger/recuperator 64 isobarically giving up its waste heat to the air and is discharged through its exhaust port. Separated water from the separator 63 enters the cooling jacket of the gas expander chamber 62 and is discharged into the radiator/condenser 65 where it is cooled and injected into the air-water compressor operating chamber 12 completing the cycle. In this embodiment, a portion of the water from the radiator/condenser 65 is also conducted into the water chamber 180 and through the water channels in the shafts 51, 56, 53, and 52 and the rotors of the air compressor 12 and gas expander 62 and from water chamber 180 is returned to the radiator/condenser 65. Also in this embodiment, a portion of the water passing through the water cooling jacket of the gas expander chamber 62 may be conducted through throttle 178 and mixed with a portion of the cool air from the separator 63 introduced into combustion chamber 121 by conduit 175 for the purpose of complementary reducing the burning temperature.

As described below, with reference to graphs of FIGS. 15 and 16, thermodynamic efficiency decrease slightly with the simplified engine 10A, but yet remains at high level.

Figure 15:
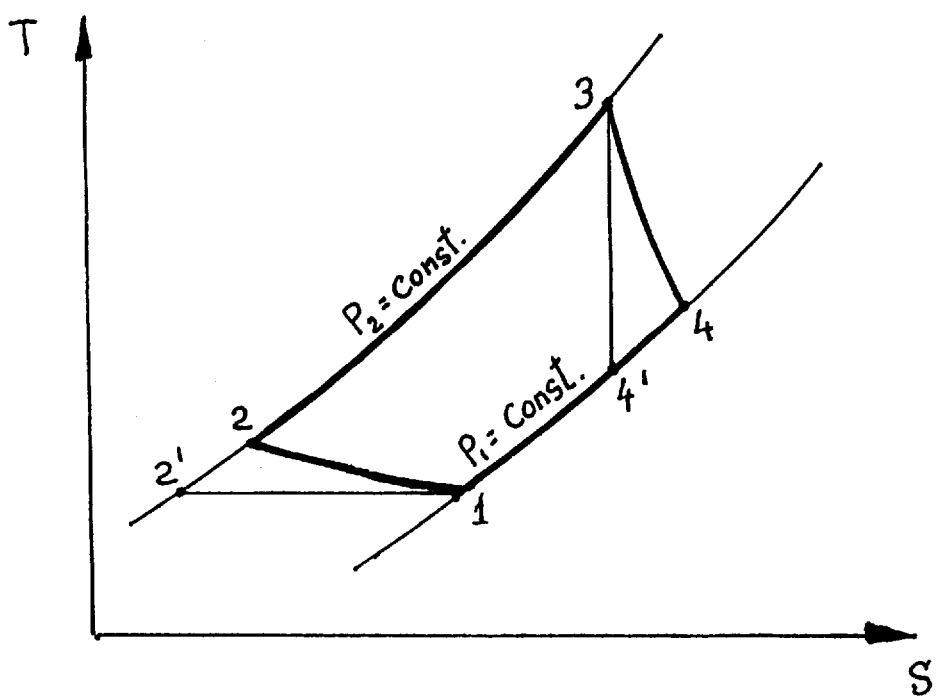
FIG. 15 is a diagram illustrating the thermodynamic cycle of the air-heat engine.

As the rotor 26 of the air-water compressor 12 turns, a large volume of ambient air is drawn in through the plurality of air intake ports 21 of the air-water compressor (point 1 in FIG. 15). Simultaneously, fine dispersed cold water is injected through the plurality of water atomizers 73 into the chamber air-water compressor chamber 12 during the continuous compressing process and mixed with air. As the air-water mixture travels around the diminishing volume of the oval-shaped air-water compressor chamber 12, the air-water mixture is compressed (represented as theoretical isothermal line 2'–1 in FIG. 15) and discharged through the exhaust port 22 and valve 24 into the vortex separator 63 (point 2' in FIG. 15). The quantity of injected cold water and its temperature is sufficient for extracting heat, thereby diminishing adiabatic heating of the air and providing the isothermal compression of the air-water mixture. The line 2–1 in FIG. 15 represents the actual process of compression of the air-water mixture.

In the vortex separator 63 air and water are divided or stratified by centrifugal force. The separated water enters the cooling jacket 129 of the gas expander chamber 62 via conduit 76 and is discharged into radiator/condenser E5. The spent heat is injected into the radiator/condenser 65 and cool water from the radiator/condenser is injected back into the air-water compressor 12. Separated cool and moist air enters the annular ring distribution channel 110 of the vortex chamber 106 of vortex heat exchanger/recuperator 64, passes through the tangential channels 109 of the radial guide member 107, and enters its central bore 108 generating vortex flow of the air. The swirling vortex passes through the interior of the nozzle 90 and enters the upper chamber 105A.

The swirling vortex flow passes downwardly in the chamber 105A and through the curvilinear channels 103 between the nozzle 92 and first toroid 97A (ejector with feedback), generating a longitudinal vortex recirculating flow path around the toroid 99 in channels 101, 103, and 105A and picks up heat from the outer heating jacket (annular ring channel 124) and inner heating jacket (cavities 98 of the toroids 97A and heat tubes 95). As a result of the Pito effect, "longitudinal" vortex circulation of the liquid is generated in the chamber 105A around toroids 99 through channels 103 and 101 such that feedback of the streams is achieved in forward and reverse directions. As a result, "transverse" vortex is added with the "longitudinal" vortex, and initiates intensive vortical structure of the streams. Due the significant centrifugal force developed in the process, separation and stratification of air takes place inside of this vortical stream.

Because the heavier fraction of cool air in the vortex heat exchanger/recuperator 64 is forced against and directly contacts with heat the transmitting surfaces of the inner and outer heating jackets, a high level of heat transfer takes place and augments the Nusselt number many-fold (up to 700%).

The process of generating vortices in sequential ejectors with feedback loops along the length of the heat transfer section leads to considerable decrease in the overall dimensions of the heat exchanger for a given heat output.

The preheated general air flow from vortex heat exchanger/recuperator 64 is directed into the pre-combustion chamber 116 and combustion chamber 121. The hot gas (point 3 in FIG. 15) from the vortex combustion chamber 121 enters the inlet port 70 of the gas expansion chamber 62 where it does useful work of expansion. Expansion causes rotation of the expander rotor 27, air-water compressor rotor 26, shafts 52, 53, 56 and the power take-off pulley 117. Spent gas from the gas expansion chamber 62 (point 4 in FIG. 15) exits through exhaust port 71 and conduit 122 and enters the vortex heat exchanger/recuperator 64, and gives off waste heat to preheat the cold compressed air in the heat exchanger/recuperator 64 and is exhausted through exhaust port 128 (point 1 in FIG. 15).

To start the engine, fuel is introduced into the combustion stabilizer 114 through the injector 152 and a portion of air from the general air flow is drawn into the precombustion chamber 116 through the opening 112 and into the combustion stabilizer 114 through air inlets 142 to create an air-fuel mixture near the spark plug 155, and the plug is activated to ignite the mixture. In cold seasons, the fuel vaporizer 153 may used to start the engine if a heavy fuel is used.

The ignited and partly pirolised super rich fuel-air mixture formed in the combustion stabilizer 114 of the precombustion chamber 116 then passes across the disk-shaped member 141, through the interior of the funnel-shaped flame tube 143, and through the channel 149 tangentially into the vortex combustion chamber 121 for after-burning. The air also flows through the annulus 139, 150 and passageways 151 between the flame tube 143 and the outer housing 111 and the conical flanged fitting 148 on the outer housing 156 of the vortex combustion chamber 121 and the annulus 167A surrounding the perforated liner 167, and thereby cooling the flame tube 143, perforated liner 167 and cylindrical side wall 168.

The combustion products of partially burned and pirolised fuel from the pre-combustion chamber 116 are caused to form a swirling vortex as they enter the vortex combustion chamber cavity 121A through the tangential channel 149. The inwardly contoured walls 159, 160 and liner 167 of the vortex combustion chamber cavity 121A, and the equinoctial condition of the centrifugal and aerodynamic forces acting on the condensed particles in the vortex stream of air in the vortex combustion chamber cavity allow unvaporized fuel droplets to be confined in equilibrium in the orbit of rotation for a sufficient length of time such that fuel droplet migration to a small radius will only occur when the droplet diameters become sufficiently small during the combustion process. This feature is a considerably effective factor in stabilizing combustion and providing a high degree of completeness of combustion.

However, in the combustion process a portion of the fuel not participating in mixing and combustion moistens the inner walls of the liner 167 in the vortex combustion chamber 121, and in the form of a migrating film of unmixed and uncombusted fuel, migrates to the lower portion of the chamber and is captured at the inward side of the annular raised lip ejector ring 174. A portion of the cool and moist air from the vortex separator 63 is directed through the conduit 175, the bypass conduit 166 and the radial passageways 164 onto the outward side of the annular raised lip ejector ring 174 and causes a venturi effect to return the trapped unmixed and uncombusted fuel as a fuel-air mixture through the recirculation channels 161, 163, and swirl nozzle 162 back into the chamber combustion zone. The swirl nozzle 162 swirls the recirculated fuel-air mixture flowing through the recirculation channel 161, 163 as it enters the interior of the vortex combustion chamber 121.

A portion of the water from the cooling jacket 129 of the gas expander 62 may also be introduced through the conduits 177 and 178 into the system along with the portion of the fuel-air mixture for the purpose of complementary reducing the burning temperature.

Efficient and reliable cooling of the combustion chamber is provided by air flows through the annulus 150 and 167A and intensive flowing of part of the cool air with a certain amount of water through recirculation channels 161, 163. Because the swirl nozzle 162 is located in the near-axis zone of the vortex combustion chamber where re-refraction occurs, the fuel-air ejector ring 174 is subjected to substantial pressure drop and its operation is intensified. The total amount of air arrives at the chamber combustion zone through air inlet ports 142, the annulus 150 and the bypass conduit 166 forming a super lean fuel-air mixture for after-burning.

The process of combustion ranging from super-rich air-fuel mixture in the pre-combustion chamber to a super-lean mixture in the vortex chamber and introducing a certain amount of water into the combustion zone assures low temperature of combustion which is the dominant factor in decreasing NOx content in exhaust gases.

The combination of the structural and operational features of the present vortex combustion chamber provide a small combustion chamber capable of burning a variety of fuels with high energy efficiency and low toxicity of the products, including NOx.

FIG. 16 is a graph showing the dependence of the theoretical thermal efficiency $\eta_{T_T}$ (represented by the thinner lines) and actual thermal efficiency $\eta_{T_A}$ (represented by the thicker lines) on the pressure ratio and the temperature $T_3$ of working gas without the Rankine cycle (point 3 in FIG. 15). The distinctive feature of this thermodynamic cycle is the low value of $$\pi = \frac{P_2}{P_1}$$

(pressure ratio) at which maximum thermal efficiency is accomplished.

The present engine achieves this result because of the air being compressed isothermally and the deep regeneration of waste heat. The dependence of the theoretical thermal efficiency is calculated according to the following equation:

$$\eta_{T_T} = \frac{\frac{K}{K-1} T_3 \left[1 - \left(\frac{1}{\pi}\right)^{\frac{K-1}{K}}\right] - T_1 \ln \pi}{\frac{K}{K-1} T_3 \left[1 - \left(\frac{1}{\pi}\right)^{\frac{K-1}{K}}\right]}$$

Where K=adiabatic exponent, $\pi = P_2/P_1$
$T_1$, $P_1$=temperature and pressure of ambient air,
$P_2$=pressure of compressed air, and
$T_3$=temperature of working gas.

The dependence of the actual thermal efficiency is calculated according to the following equation:

$$\eta_{TA} = \frac{\eta_E \frac{K}{K-1} T_3 \left[1 - \left(\frac{1}{\pi}\right)^{\frac{K-1}{K}}\right] - \left(\frac{1}{\eta_C} + \eta_I\right) T_1 ln\pi}{\eta_E \frac{K}{K-1} T_3 \left[1 - \left(\frac{1}{\pi}\right)^{\frac{K-1}{K}}\right] + (1-\eta_R)\frac{K}{K-1}\left\{\left\{T_3\left\{1 - \eta_E\left[1 - \left(\frac{1}{\pi}\right)^{\frac{K-1}{K}}\right]\right\}\right\} - T_2\right\}}$$

Where $T_2$=actual temperature of compressed air
$\eta_E$=efficiency of expander,
$\eta_C$=efficiency of compressor,
$\eta_I$=coefficient of air compression unisothermally, and
$\eta_R$=efficiency of regeneration completeness.

For the purpose of additional utilization of waste heat and increasing the thermal efficiency of the present engine, especially for stationary power plants of large output, it is advantageous to employ a combination of cycles, i.e., supplement the foregoing gas cycle with isothermal compression of air and adiabatic expansion of gas on deep regeneration of waste heat with a Rankine cycle. The first embodiment of the engine 10 previously described with reference to FIGS. 1–1C having a vortex boiler 78 and steam expander 11 provides a supplementary Rankine cycle.

Referring to FIG. 1 and additionally to FIG. 6 and 8, separated and heated water from the cooling jacket 129 of the gas expansion chamber 62 conducted through conduit 130 enters the annular ring distribution channel 110 of the vortex chamber 106 of the vortex boiler 78, passes through the tangential channels 109 of the guide member 107 and enters its central bore 108, generating vortex flow of the water. The swirling vortex passes downwardly through the interior of the nozzle 90 and enters the upper chamber 105A.

The swirling vortex flow passes downwardly in the chamber 105A and through the curvilinear channels 103 between the nozzle 92 and first toroid 97A (ejector with feedback), generating a longitudinal vortex recirculating flow path around the toroid 97A in channels 101, 103 and 105A and picks up heat from the outer heating jacket (annular ring channel 124) and inner heating jacket (cavities 98 of the toroids 97A and heat tubes 95). As a result of the Pito effect, "longitudinal" vortex circulation of the liquid is generated in the chamber 105A around toroids 97A through channels 103 and 101 such that feedback of the streams is achieved in forward and reverse directions. As a result, "transverse" vortex is added with the "longitudinal" vortex, and initiates intensive vortical structure of the streams. Due the significant centrifugal force developed in the process, separation and stratification of liquid takes place inside of this vortical stream.

Unvaporized liquid is brought into contact with the interior surface 100 of the heat transfer pipe 138 by centrifugal force and interior surface 99A of toroids 97A.

As best seen in FIG. 7, vaporized water from the chamber 105A and first toroid 97A passes downwardly through the central bores of the nozzles 92 and 91 and enters the chamber 105B in the form of a swirling vortex. The swirling vortex of steam passes downwardly in the chamber 105B and through the curvilinear channels 103 between the nozzle 93 and second toroid 97B (ejector with feedback), generating a longitudinal vortex recirculating flow path around the second toroid 97B in channels 103, 101 and 105B and picks up heat from the outer heating jacket (annular ring channel 124) and inner heating jacket (cavities 98 of the toroids 97B and heat tubes 95). In the process, the steam is superheated.

The superheated steam under pressure passes through the central bore of the nozzle 93 through the channel 134 mounted therein and enters the inlet port 19 of the expander 11 and is expanded to cause rotation of the shafts 52, 53, 54, 55, 56 and 57. Exhaust steam in the form of a steam-water mixture is discharged through the exhaust port 20 of the steam expansion chamber 11, through conduit 135, and enters the radiator/condenser 65. Cooled water is drawn from the radiator/condenser 65 and pumped into conduit 72 by the pump 66, and dispersed through the water atomizers 73 in fine-dispersed form and becomes added to the air being compressed in the air-water compressor 12. Available power may be transmitted by means of the pulley 117 as the shaft 57 rotates.

Because the heavier fraction of water in the boiler or cooler vapor in the vapor-superheater is forced against and directly contacts the heat transmitting surfaces of the inner and outer heating jackets, a high level of heat transfer takes place many-fold.

While this invention has been described fully and completely with special emphasis upon preferred embodiments, it should be understood that within the scope of the appended claims the invention may be practiced otherwise than as specifically described herein.

We claim:

1. A method for transforming thermal energy into mechanical energy utilizing a rotary air-heat apparatus and isothermal compression of air, comprising the steps of:

isothermally compressing an ambient air and water mixture in a rotary air-water compressor having a rotor;

separating said isothermally compressed air and water mixture into an air component and a water component;

preheating said separated air component in a heat exchanger to produce preheated air;

introducing a portion of said preheated air into a combustion chamber, mixing a fuel with said preheated compressed air to form a combustible mixture, igniting the mixture and discharging the product as a working fluid;

introducing said working fluid into a rotary gas expander having a cooling system and a rotor operatively connected with said rotary air-water compressor rotor;

adiabatically expanding said working fluid in said rotary gas expander to rotate said gas expander rotor and drive said air-water compressor rotor and produce useful work;

introducing a portion of said separated water component into said cooling system of said rotary gas expander;

discharging a portion of the spent working fluid expanded in said gas expander to said heat exchanger to be used as waste heat to produce said preheated air;

conducting said water from said rotary gas expander cooling system into a condenser to form cool water; and atomizing a portion of said cool water from said condenser and mixing said atomized cool water with said ambient air and introducing it into said air-water compressor to facilitate isothermal compression of said air and water mixture.

2. The method according to claim 1 including the further steps of:

introducing another portion of said separated water component into a boiler to produce steam;

discharging another portion of said spent working fluid expanded in said gas expander into said boiler to be used as waste heat to produce said steam;

introducing said produced steam into a rotary steam expander having a rotor operatively connected with said rotary gas expander rotor and said rotary air-water compressor rotor, thereby driving said steam expander rotor, said gas expander rotor, and said rotary air-water compressor rotor and producing useful work;

conducting spent steam from said rotary steam expander into said condenser to form cool water; and conducting said water from said rotary gas expander cooling system into said condenser to form cool water; and atomizing a portion of said cool water from said condenser and mixing said atomized cool water with said ambient air and introducing it into said air-water compressor to facilitate isothermal compression of said air and water mixture.

3. The method according to claim 2 including the further steps of conducting another portion of said cool water from said condenser through passageways in said air-water compressor rotor and said gas expander rotor and returning it to said condenser.

4. The method according to claim 1 including the further steps of mixing another portion of said separated isothermally compressed air with a portion of said separated water component passing through said cooling system of said rotary gas expander and introducing the mixture into said combustion chamber to facilitate a reduced burning temperature.

5. A rotary air-heat engine utilizing isothermal compression of air comprising:

a rotary air-water compressor having a rotor, an ambient air intake, water atomizer injectors, and an air-water mixture discharge port;

an air-water separator having an inlet connected with said air-water compressor air-water mixture discharge port, a water outlet, and an air outlet;

a heat exchanger having an air inlet connected with said air-water separator air outlet, a working fluid inlet, an exhaust port, and a preheated air outlet;

a combustion chamber having a preheated air inlet connected with said heat exchanger preheated air outlet and a high temperature working fluid discharge port;

a rotary gas expander having a rotor operatively connected with said rotary air-water compressor rotor for rotating said air-water compressor rotor, a working fluid inlet connected with said combustion chamber working fluid discharge port, a working fluid outlet connected with said heat exchanger working fluid inlet, and a water cooling system including a water inlet connected with said air-water separator water outlet and a water outlet;

power take-off means connected with at least one of said rotors; and a water condenser having an inlet connected with said gas expander water cooling system water outlet, and an outlet connected with said air-water compressor water atomizer injectors; wherein ambient air is drawn into said air-water compressor upon rotation of its said rotor and atomized water is introduced into said air-water compressor through said water atomizer injectors to form an ambient air-water mixture therein and upon continued rotation of said rotor, said ambient air-water mixture is isothermally compressed and the compressed air-water mixture is discharged into said air-water separator where water is separated from said isothermally compressed air-water mixture and discharged into said gas expander water cooling system and air separated from said air-water mixture is discharged into said heat exchanger, preheated therein, and discharged into said combustion chamber and the products of combustion are discharged into said rotary gas expander as a working fluid, adiabatically expanded therein to rotate its said rotor, said air-water compressor rotor and said power take-off means and thereby produce useful work, and spent working fluid is discharged from said rotary gas expander into said heat exchanger and used as waste heat to preheat air passing therethrough.

6. The air-heat engine according to claim 5 wherein said rotary gas expander rotor and said rotary air-water compressor rotor each have interior hollow water chambers therein defining water jackets and are mounted on hollow rotary shafts having a central water channel extending therethrough in fluid communication with said water jackets, and water inlet and outlet means at opposed outer ends of said shafts in fluid communication with said water channel;

said water inlet at one end of said shafts connected with said water condenser outlet, and said water outlet means at an opposed end of said shafts connected with said water condenser inlet; wherein a portion of said water from said water condenser is conducted through said central water channel in said shafts and through said water jackets and returned to said water condenser.

7. The air-heat engine according to claim 5 wherein said heat exchanger comprises a hollow generally cylindrical outer member;

a hollow cylindrical heat transfer pipe secured concentrically within said outer member having an outer diameter smaller than the inner diameter of said outer member to define an elongate generally cylindrical annulus therebetween, the interior of said heat transfer pipe defining a central vortex chamber, one end of said central vortex chamber having an inlet connected with said air outlet of said air-water separator and another end defining said preheated air outlet, said heat exchanger air inlet and vortex means being in fluid communication with said annulus, said annulus having an inlet end connected with said working fluid inlet for receiving said working fluid from said gas expander and said exhaust port disposed at an opposed end, and said annulus serving as an outer heating jacket;

said heat transfer pipe having a plurality of first heat channels extending the length of said heat transfer pipe with inlet ends in communication with working fluid inlet and their opposed ends in communication with said exhaust port exhausting spent working fluid; and a plurality of longitudinally spaced elongate curvilinear looped fluid recirculation channels having an inner longitudinal portion in communication with said central vortex chamber and an outer longitudinal portion in communication with said annulus for conducting a portion of said swirling vortex of working fluid in a longitudinal and transverse recirculating flow path around said first heat channels in heat exchange relation and feeding it back into said central swirling vortex;

said swirling vortex of fluid being separated into a cooler air fraction and a hotter air fraction and the cooler air being brought into contact with the interior surface of said heat transfer pipe by centrifugal force and a portion thereof returned into said central swirling vortex for reheating, and the hotter air fraction passing through said preheated air outlet.

8. The air-heat engine according to claim 5 wherein said rotary gas expander and said rotary air-water compressor each has an oval-shaped operating chamber with a peripheral side wall which is oval-shaped in cross section, parallel opposed facing flat end walls, and a continuous cylindrical-shaped guide groove concentric with said peripheral side wall formed in each said end wall;

a cylindrical rotor having a circular side wall, parallel opposed flat end walls, a concentric shaft extending outwardly from each said end wall, and at least two mutually perpendicular slots extending radially through said rotor with a radial extending portion of each said slot extending through said end walls, said rotor rotatably mounted by said shafts eccentrically in said operating chambers relative to the major axis of said operating chamber;

at least two elongate rectangular rotor blades one slidably mounted in each of said slots extending through said rotor in mutually perpendicular relation and each independently movable relative to the other in a radial direction, each said rotor blade having a guide element extending from opposed sides and through said radial extending portion of each said slot outwardly from said rotor end walls and slidably received in said cylindrical-shaped guide groove in said operating chamber end walls;

said rotary gas expander and said rotary air-water compressor rotor connected together by said shafts in concentric relation whereby rotation of said gas expander rotor causes simultaneous rotation of said air-water compressor rotor, and upon rotation of said gas expander rotor and said air-water compressor rotor said guide elements traveling in said cylindrical-shaped guide grooves causing said rotor blades to extend and retract radially with their outer ends following the inner periphery of the respective oval-shaped side walls of said operating chambers with a constant minimum clearance between the outer tip ends of said blades and said inner peripheries;

said rotary gas expander working fluid inlet and working fluid outlet are each configured to receive said working fluid and discharge said spent working fluid, respectively, tangential to the axis of rotation of said gas expander rotor, said working fluid expanding adiabatically in said operating chamber to impart a force on said blades to cause rotation of said gas expander rotor and said air-water compressor rotor and said power take-off means;

said rotary air-water compressor ambient air intake and said air-water mixture discharge port are each configured to draw ambient air into said compressor operating chamber and discharge said air-water mixture tangential to the axis of rotation of said air-compressor rotor upon rotation thereof, and as rotation continues said compressor blades pressurizing the air-water mixture in said compressor operating chamber and discharging the pressurized air-water mixture through said air-water mixture discharge port to said air-water separator.

9. The air-heat engine according to claim 8 further comprising:

a water channel conduit exterior of said air-water compressor operating chamber having a water inlet at one end;

a plurality of water atomizer injectors disposed between said water channel conduit and said air-water compressor, each having an interior in fluid communication with the interior of said water channel conduit and said air-water compressor operating chamber; and pump means having a water inlet connected with said water condenser outlet and a water discharge end connected with said water channel conduit water inlet.

10. The air-heat engine according to claim 8 further comprising roller means on each said rotor disposed adjacent said radially extending slots and engaged with said rotor blades to support and facilitate extension and retraction thereof.

11. The air-heat engine according to claim 8 further comprising guide roller means at the outer of said rotor blade guide elements rotatably engaged in said cylindrical-shaped guide grooves in said operating chamber end walls.

12. The air-heat engine according to claim 8 further comprising:

lubrication means connected with said guide grooves in said operating chamber side walls to provide lubrication to said guide roller means, and lubricant seal means surrounding each said guide groove disposed between the inner surface of each said operating chamber end wall and the outer surfaces of each said rotor end wall to form a lubricant sealing relation therebetween.

13. The air-heat engine according to claim 8 further comprising:

seal means disposed between the outer surfaces of each said rotor end wall periphery and the inner surface of each said operating chamber end wall to form a sealing relation therebetween; and seal means disposed in said circular side wall slots through which said blades extend to form a sealing relation on at least three flat surfaces of each said blade.

14. The air-heat engine according to claim 5 wherein said combustion chamber is a generally cylindrical member having a circular side wall surrounding a central chamber, vertically spaced top and bottom walls having opposite facing outwardly concave curved surfaces with the axial distance between said curved surfaces increasing inversely from their periphery with respect to the radial distance, working fluid inlet means positioned tangent to said circular side wall to receive said heated working fluid and cause it to swirl as it enters said central chamber, and working fluid outlet means connected with said gas expander working fluid inlet to discharge the working fluid tangentially into said gas expander.

15. The air-heat engine according to claim 14 further comprising:

a pre-combustion chamber having fuel inlet means to introduce a combustible fuel thereinto, air inlet means to introduce air thereinto and mix it with said fuel to produce a rich fuel-air mixture, fuel ignition means to ignite said fuel-air mixture to produce said working fluid, and working fluid outlet means connected with said combustion chamber working fluid inlet to discharge said working fluid tangentially into said central chamber.

16. The air-heat engine according to claim 14 further comprising:

collecting means disposed in the near-axis zone of said combustion chamber top wall to collect condensed particles of the unmixed and uncombusted fuel-air mixture; and recirculating channel means extending between said collecting means and the near-axis zone of said combustion chamber bottom wall to recirculate said condensed particles of unmixed and uncombusted fuel-air mixture back into said central chamber to be mixed with the heated swirling working fluid received in said central chamber.

17. The engine according to claim 16 wherein said collecting means is connected with said air-water separator air outlet to receive a portion of the separated compressed air and water discharged therefrom; and said collecting means has a surface configured to capture said collected particles and to create a venturi effect in said compressed air being received thereby mixing said collected particles with said compressed air and water and discharging the mixture into said recirculating channel.

18. The air-heat engine according to claim 5 further comprising:

a rotary steam expander disposed between said rotary gas expander and said air-water compressor having a rotor connected with said gas expander rotor and said air-water compressor rotor, a steam inlet, and a spent steam outlet connected with said water condenser inlet;

a boiler having water inlet connected with said gas expander water cooling system water outlet for receiving water therefrom, a working fluid inlet connected with said gas expander working fluid outlet, a steam outlet connected with said steam expander steam inlet, and a waste heat exhaust port; wherein ambient air is drawn into said air-water compressor upon rotation thereof and atomized water is introduced into said air-water compressor to form an ambient air-water mixture therein and upon continued rotation said ambient air-water mixture is isothermally compressed and the compressed air-water mixture is discharged into said air-water separator where water is separated from said isothermally compressed air and water mixture and conducted through said gas expander cooling system and into said boiler and heated by said boiler to produce steam, waste heat is exhausted from said boiler, steam is discharged from said boiler into said steam expander rotating said steam expander rotor, said gas expander rotor, said air-water compressor rotor and said power take-off means, thereby producing useful work, and the spent steam is discharged from said rotary steam expander into said water condenser.

19. The air-heat engine according to claim 18 wherein said boiler has vortex means adjacent said water inlet for causing received water to form a swirling vortex, and at least one elongate curvilinear looped fluid recirculation channel in said boiler configured to generate longitudinal and transverse vortex flow of a portion of said received water and to recirculate said portion back into said swirling vortex until reaching a temperature sufficient to vaporize said water and discharge it as steam to be expanded in said rotary steam expander.

20. The air-heat engine according to claim 19 wherein said rotary steam expander has an oval-shaped operating chamber with a peripheral side wall which is oval-shaped in cross section, parallel opposed facing flat end walls, and a continuous cylindrical-shaped guide groove concentric with said peripheral side wall formed in each said end wall;

a cylindrical rotor having a circular side wall, parallel opposed flat end walls, a concentric shaft extending outwardly from each said end wall, and at least two mutually perpendicular slots extending radially through said rotor with a radial extending of each said slot extending through said end walls, said rotor rotatably mounted by said shafts eccentrically in said operating chamber relative to the major axis of said operating chambers;

at least two elongate rectangular rotor blades one slidably mounted in each of said slots extending through said rotor in mutually perpendicular relation and each independently movable relative to the other in a radial direction, each said rotor blade having a guide element extending from opposed sides and through said radial extending portion of each said slot outwardly from said rotor end walls and slidably received in said cylindrical-shaped guide groove in said operating chamber end wall;

said steam expander rotor connected by said shafts with said gas expander rotor and said air-water compressor rotor in concentric relation whereby rotation of said gas expander rotor and said steam expander rotor causes simultaneous rotation of said air-water compressor rotor and said power take-off means, and upon rotation of said gas expander rotor, said air-water compressor rotor, and said steam expander rotor, said guide elements traveling in said cylindrical-shaped guide groove causing said rotor blades to extend and retract radially with their outer ends following the inner periphery of said oval-shaped side wall of said steam expander operating chamber with a constant minimum clearance between the outer tip ends of said blades and said inner peripheries;

said rotary steam expander steam inlet and said spent steam outlet are each configured to receive said steam and discharge said spent steam, respectively, tangential to the axis of rotation of said steam expander rotor, said steam expanding in said operating chamber to impart a force on said blades to cause rotation of said rotor and discharge said spent steam through said spent steam outlet to said water condenser.

* * * * *